United States Patent
Takahashi et al.

(10) Patent No.: US 10,133,256 B2
(45) Date of Patent: Nov. 20, 2018

(54) INFORMATION PROCESSING APPARATUS AND METHOD FOR CALCULATING INSPECTION RANGES

(71) Applicant: FUJITSU LIMITED, Kawasaki-shi, Kanagawa (JP)

(72) Inventors: Fumiyuki Takahashi, Atsugi (JP); Tetsuo Koezuka, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 344 days.

(21) Appl. No.: 14/967,488

(22) Filed: Dec. 14, 2015

(65) Prior Publication Data

US 2016/0098032 A1    Apr. 7, 2016

Related U.S. Application Data

(63) Continuation of application No. PCT/JP2013/069609, filed on Jul. 19, 2013.

(51) Int. Cl.
    *G05B 19/4065*      (2006.01)
    *G05B 19/42*      (2006.01)

(52) U.S. Cl.
    CPC ......... *G05B 19/4065* (2013.01); *G05B 19/42* (2013.01); *G05B 2219/37448* (2013.01)

(58) Field of Classification Search
    CPC ..................................................... G05B 19/42
    See application file for complete search history.

(56) References Cited

U.S. PATENT DOCUMENTS

| | | | | |
|---|---|---|---|---|
| 6,283,380 | B1 * | 9/2001 | Nakanishi | F24F 11/053 236/49.3 |
| 6,555,836 | B1 * | 4/2003 | Takahashi | G01N 21/95684 250/559.19 |
| 2012/0013616 | A1 | 1/2012 | Uesaki | |
| 2012/0327086 | A1 | 12/2012 | Shimbaru | |

FOREIGN PATENT DOCUMENTS

| | | |
|---|---|---|
| JP | H02-255160 | 10/1990 |
| JP | H05-197416 | 8/1993 |
| JP | H11-339044 | 12/1999 |

(Continued)

OTHER PUBLICATIONS

JPOA—Office Action dated Aug. 9, 2016 for corresponding Japanese Application No. 2015-527121, with English translation of relevant part: p. 1 line 20 to p. 2 line 17; and p. 2 line 21 to 23.

(Continued)

*Primary Examiner* — Raj R Gupta
(74) *Attorney, Agent, or Firm* — Fujitsu Patent Center

(57) ABSTRACT

An information processing apparatus includes a processor and a memory. The memory stores three-dimensional data describing a real device including an object, a source of an acting factor that acts on the object and causes a detectable change at the object, and a detector that detects the change in a specified detection range. The processor produces a virtual device that represents the real device in a virtual space, based on the three-dimensional data in the memory. With this virtual device, the processor simulates the change caused by the acting factor, and calculates a region of the object in which the simulated change satisfies a specified condition.

15 Claims, 28 Drawing Sheets

(56) References Cited

FOREIGN PATENT DOCUMENTS

| | | |
|---|---|---|
| JP | 2000-283526 | 10/2000 |
| JP | 2005-052926 | 3/2005 |
| JP | 2005052926 A * | 3/2005 |
| JP | 2006-110705 | 4/2006 |
| JP | 2009-248214 | 10/2009 |
| JP | 2011-011321 | 1/2011 |
| JP | 2011-248476 | 12/2011 |
| WO | 2011/105048 | 9/2011 |
| WO | 2011/111095 | 9/2011 |

OTHER PUBLICATIONS

Zhengyou Zhang, Technical Report MSR-TR-98-71, "A Flexible New Technique for Camera Calibration" IEEE Transactions on Pattern Analysis and Machine Intelligence 22(11):1330-1334, 2000; Microsoft Research, Microsoft Corporation, Dec. 2, 1998.

Hugues Hoppe et al.,"Surface Reconstruction from Unorganized Points", SIGGRAPH '92 Proceedings of the 19th Annual Conference on Computer Graphics and Interactive Techniques, pp. 71-78, Jul. 1992.

International Search Report for PCT/JP2013/069609, dated Oct. 8, 2013.

Written Opinion for PCT/JP2013/069609 (Box V), dated Oct. 8, 2013.

\* cited by examiner (A) REAL DEVICE PICTURE

WK: WORK

Reflection of illumination

FIG. 14  AREA CALCULATION

FIG. 15  RESOLUTION CALCULATION

FIG. 17  LUMINOUS ENERGY LEVEL ADJUSTMENT
(A) REAL DEVICE PICTURE
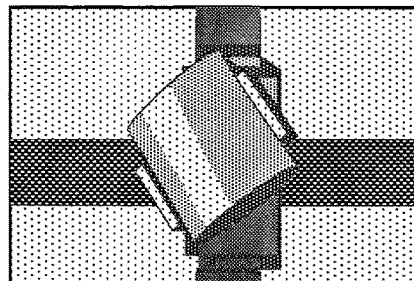
(D21 & D22) SECONDARY DATA
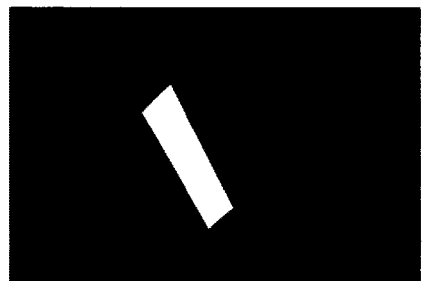
Af: INSPECTION AREA
(A) REAL DEVICE PICTURE
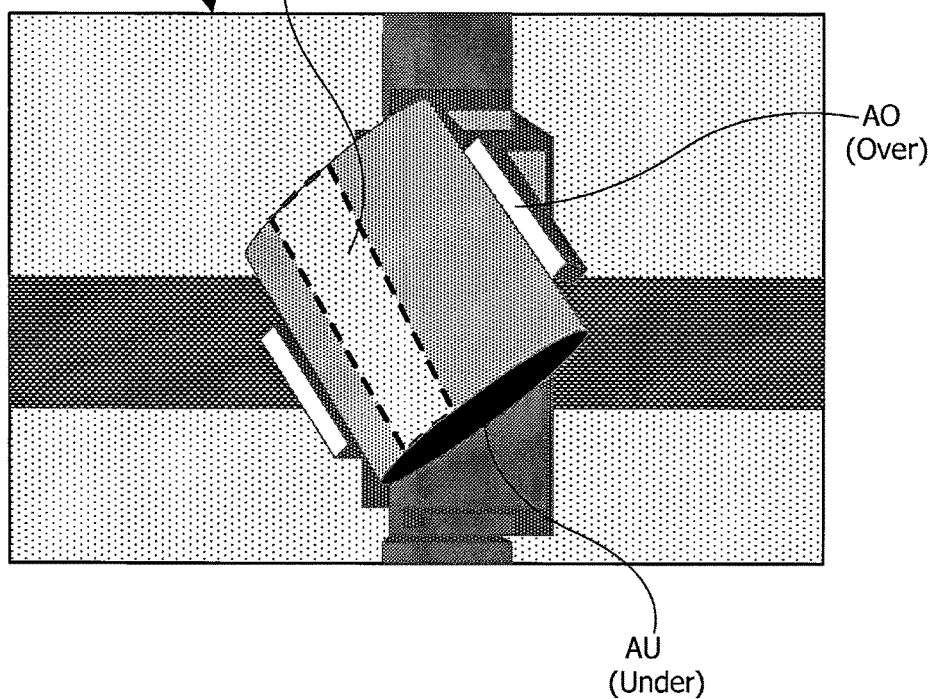
AO (Over)
AU (Under)

(A) REAL DEVICE PICTURE   WK: WORK
Reflection of illumination
SP: EXCEPTION AREA

FIG. 19
AREA CALCULATION
(EXCLUDING EXCEPTION AREA)
(B) VIRTUAL DEVICE PICTURE
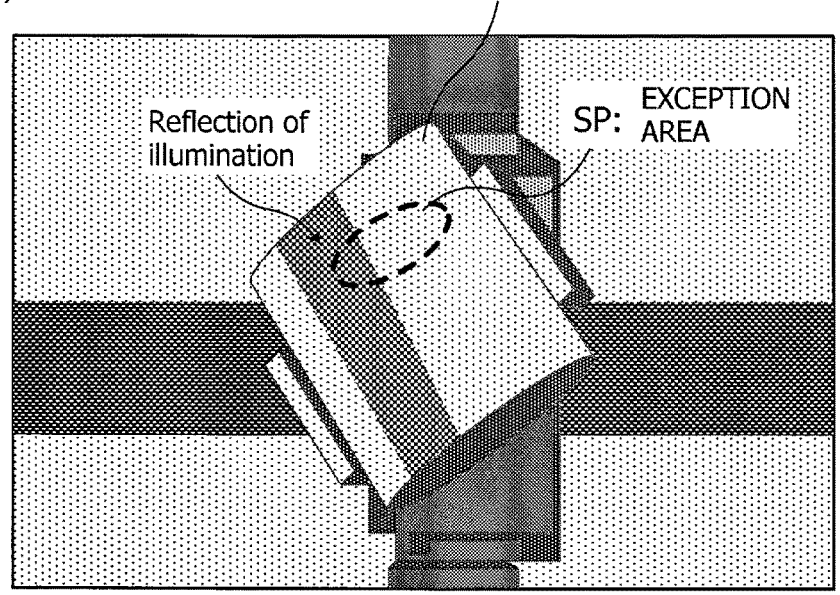
(D25) SECONDARY DATA
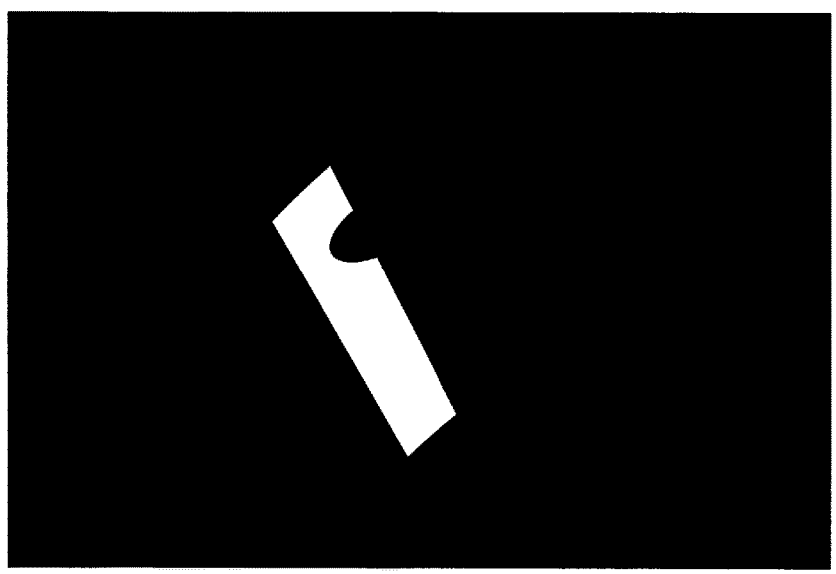

(A) REAL DEVICE PICTURE
(WITH CONDITIONS CHANGED)

WK: WORK

Reflection of illumination (A) REAL DEVICE PICTURE
(WITH CHANGED CONDITIONS)

PAST AREA VIEW

VARIATION #1
(BRIGHT-FIELD ILLUMINATION)

(A) REAL DEVICE PICTURE   WK: WORK

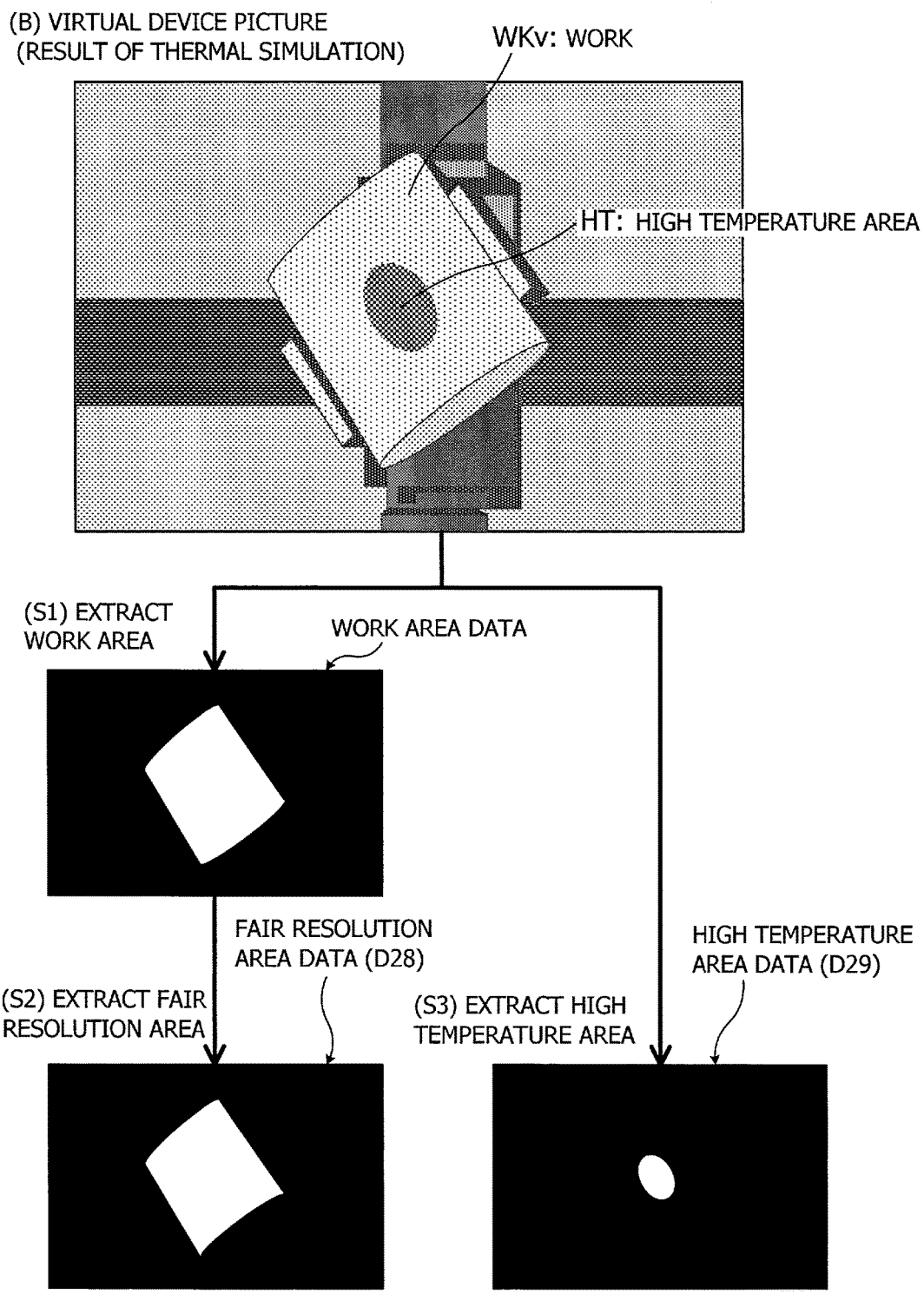
FIG. 28 — AREA CALCULATION (VARIATION#2)

INFORMATION PROCESSING APPARATUS AND METHOD FOR CALCULATING INSPECTION RANGES

CROSS-REFERENCE TO RELATED APPLICATION

This application is a continuation application of International Application PCT/JP2013/069609 filed on Jul. 19, 2013 which designated the U.S., the entire contents of which are incorporated herein by reference.

FIELD

The embodiments discussed herein relate to an information processing apparatus and a method for calculating inspection ranges.

BACKGROUND

Various devices and tools are used in the manufacturing industry, including assembly machines and inspection devices. Some of these manufacturing devices need a configuration task to register parameters and data for use in their actual operations. Such a configuration task for a manufacturing device is sometimes called "teaching" and often done by a human operator capable of properly recognizing the situation and making an appropriate decision according to information detected in the device. The teaching is therefore a time-consuming task, and the accuracy of its result depends heavily on the operator's skill level. It is not simple and easy to computerize a teaching process because of the difficulty in recognizing which pieces of detected information are useful for the operations of the device.

As one technique in the above field, a teaching system is proposed for assisting an operator in teaching an inspection device. The proposed system is formed from a personal computer, a monitor, a mouse, and the like and coupled to a visual inspection device designed to inspect a work under test. The visual inspection device tests the work on the basis of pictures taken by a camera that moves from one inspection point to another. The teaching system helps the operator with the task of giving such a camera path into the visual inspection device. More specifically, the personal computer offers three-dimensional (3D) computer-aided design (CAD) functions to display virtual images of a work on its monitor screen, as if a camera takes pictures of the work. The operator manipulates the personal computer to produce desired inspection images on the monitor screen and specifies each appropriate one of those images. The personal computer calculates an inspection point corresponding to each inspection image specified by the operator and then determines in what order to inspect the resulting points. See, for example, Japanese Laid-open Patent Publication No. 2005-52926.

The above-described teaching system allows the operator to execute a teaching task in a virtual space based on 3D CAD techniques, without actually operating the visual inspection device, but only by watching virtual pictures on a monitor screen. The proposed way of teaching is useful in previously selecting and checking an appropriate motion path of a camera, so that it will visit a plurality of inspection points without making the camera-carrying robot collide against the work. However, choosing proper inspection points in the virtual inspection pictures is still the operator's responsibility. This is a time-consuming task in which a human operator is called for to recognize the situation and make a right decision. Automation in such a human-related part of teaching tasks would make it more efficient to configure and operate manufacturing devices.

SUMMARY

According to one aspect, there is provided an information processing apparatus including: a memory configured to store three-dimensional data describing a real device including an object, a source of an acting factor that acts on the object and causes a detectable change at the object, and a detector that detects the change in a specified detection range; and a processor configured to perform a procedure including: producing a virtual device that represents the real device in a virtual space, based on the three-dimensional data in the memory, simulating, with the virtual device, the change caused by the acting factor, and calculating a region of the object in which the simulated change satisfies a specified condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 explains a method for adjusting luminous energy levels by using secondary data according to the second embodiment;

FIGS. 18 and 19 are first and second diagrams that explain area calculation with an exception area as still another method for calculating secondary data according to the second embodiment;

FIGS. 27 and 28 are first and second drawings that explain how to calculate secondary data according to variation #2 of the second embodiment.

DESCRIPTION OF EMBODIMENTS

Figure 1:
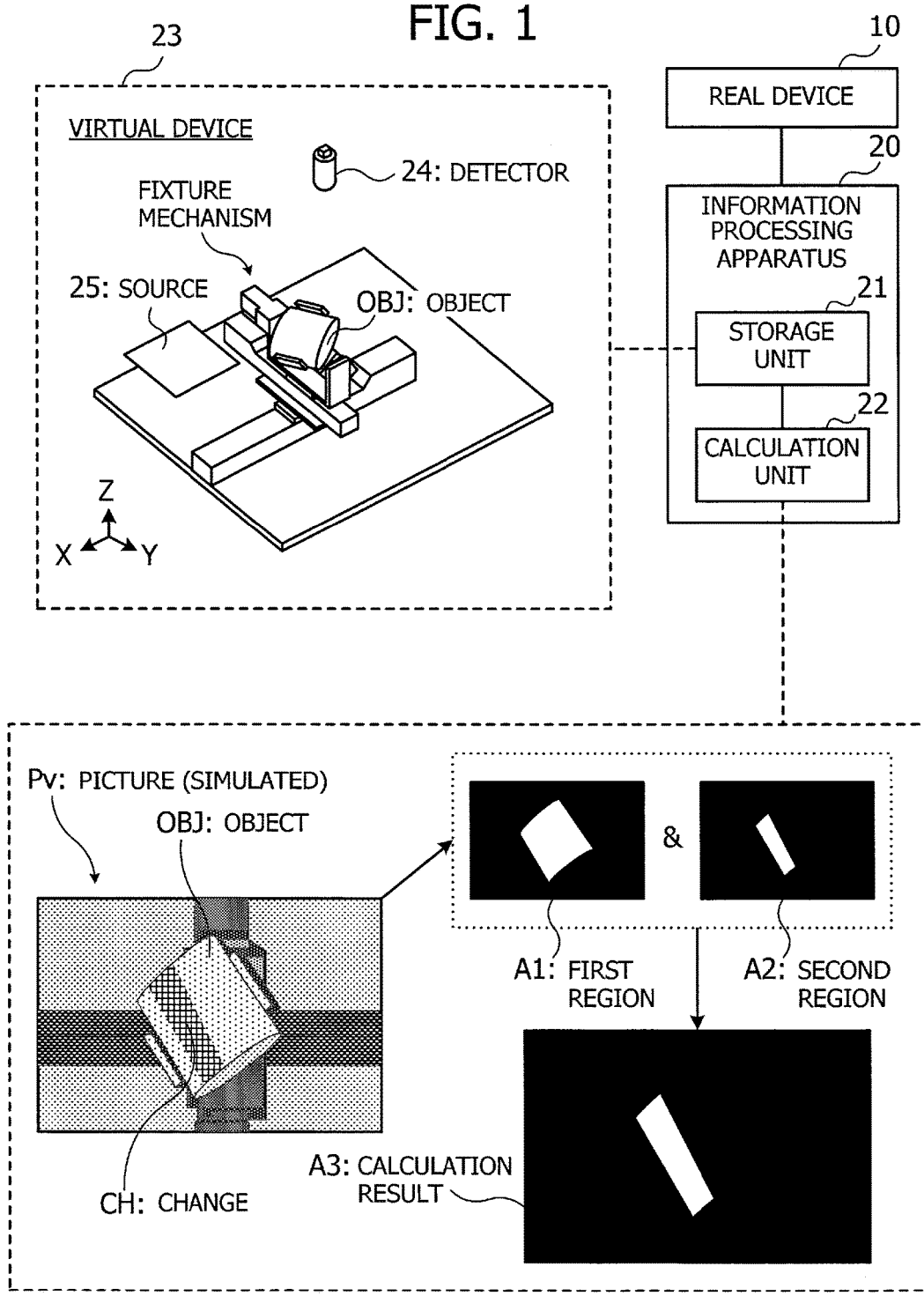
FIG. 1 illustrates an example of a system according to a first embodiment.

Several embodiments will now be described below with reference to the accompanying drawings. Note that some components may repeatedly appear with consistent reference numerals in this description and its accompanying drawings. These components provide substantially the same functions in different embodiments, and their description may not be repeated each time they appear.

1. FIRST EMBODIMENT

Part 1 describes a first embodiment with reference to FIG. 1. FIG. 1 illustrates an example of a system according to the first embodiment. The illustrated system is formed from a real device 10 and an information processing apparatus 20.

The real device 10 includes an object under inspection and a source of an acting factor (e.g., light) that acts upon the object to produce a detectable change CH at that object. The real device 10 also includes a detector capable of detecting the produced change CH in a specified detection range.

The information processing apparatus 20 includes a storage unit 21 and a calculation unit 22. The storage unit 21 may be a combination of volatile storage devices (not illustrated), such as random access memory (RAM) chips, and non-volatile storage devices (not illustrated), such as hard disk drives (HDD) and flash memory.

The calculation unit 22 may include a processor, such as a central processing unit (CPU) and a digital signal processor (DSP). The calculation unit 22 may also be implemented by using an application-specific integrated circuit (ASIC), field-programmable gate array (FPGA), or any other electronic circuit. For example, the calculation unit 22 is configured to execute a program stored in the storage unit 21 or other memory.

The storage unit 21 is where three-dimensional data describing the real device 10 is stored. For example, this three-dimensional data indicates the position, posture, and geometry (shape) of the aforementioned object, as well as those of a fixture mechanism for mounting the object. The three-dimensional data further indicates the same for the source and detector discussed above. On the basis of this set of three-dimensional data, the calculation unit 22 produces a virtual device 23 that represents the real device 10 in a virtual space.

For example, the calculation unit 22 produces an object OBJ in a virtual space to represent the aforementioned object used in the real device 10. The calculation unit 22 also produces a detector 24 in the virtual space to represent the aforementioned detector used in the real device 10. The calculation unit 22 further produces a source 25 in the virtual space to represent the aforementioned source used in the real device 10. The calculation unit 22 similarly produces a virtual version of the aforementioned fixture mechanism.

As can be seen from the above, the calculation unit 22 is designed to reproduce a real device 10 in a virtual space by using its three-dimensional data (e.g., 3D CAD data). That is, a virtual device 23 is produced from three-dimensional data of the real device 10, and this virtual device 23 permits the calculation unit 22 to simulate how the real device 10 will act when, for example, particular control signals are received. The calculation unit 22 may be able to cause the virtual device 23 to also receive such control signals similarly to the real device and operate in the same way as the real device 10 according to the received signals.

The calculation unit 22 also utilizes the virtual device 23 to simulate a change CH that is expected to appear at the real device 10 when a certain acting factor is applied thereto. The acting factor may be, for example, light, heat, sound, electromagnetic waves, pressure, or other physical energy or field. As will be described below, the system may operate differently depending on which acting factor is used.

When light is used as the acting factor, the calculation unit 22 executes an optical simulation in the environment where the virtual device 23 resides. The detector 24 and source 25 in this case are a simulated camera and a simulated light source, respectively.

When heat is used as the acting factor, the calculation unit 22 executes a temperature simulation. The detector 24 and source 25 in this case are a simulated temperature sensor and a simulated heat source, respectively.

When sound is used as the acting factor, the calculation unit 22 executes a sound simulation. The detector 24 and source 25 in this case are a simulated microphone and a simulated sound source, respectively.

When electromagnetic waves are used as the acting factor, the calculation unit 22 performs an electromagnetic field simulation. The detector 24 and source 25 in this case are a simulated electromagnetic field sensor and a simulated electromagnetic source, respectively.

When pressure is used as the acting factor, the calculation unit 22 performs a simulation using finite element analysis or other technique. The detector 24 and source 25 in this case are a simulated strain gauge and a simulated pressure source, respectively.

The calculation unit 22 also calculates a region of the object OBJ in which a change CH has been detected as satisfying a set condition. This region is seen in FIG. 1 as a calculation result A3. More specifically, the calculation unit 22 obtains the result A3 in the following way, assuming that the effecting element is light. The calculation unit 22 first simulates what the detector 24 detects from the object OBJ in illumination by the source 25, thereby obtaining a picture Pv of the illuminated object OBJ. The picture Pv includes an image of the object OBJ, whose surface reflects the incident light. The intensity distribution of reflected light may vary depending on the object OBJ's current position and posture, as well as the shape of the object OBJ and the strength of the illumination.

The calculation unit 22 then identifies which region of the object OBJ satisfies a condition given in terms of the object's shape. This region is referred to herein as a "first region" A1. For example, there may be a certain region that is supposed to be ignored in the process of evaluating distribution of reflected light intensity for some reasons about the shape and mounting condition of the object OBJ. A condition is thus set for the calculation unit 22 to exclude such a region. As this condition relates to the object shape, three-dimensional data (e.g., 3D CAD data) of the object OBJ may be used here to calculate a first region A1.

The calculation unit 22 detects another object region whose intensity of light reflection is higher than a specified threshold. Actually, this detected region corresponds to the change CH mentioned above. In other words, such a region exhibiting a higher intensity of reflection light is referred to as a change CH. The calculation unit 22 may be able to, for example, calculate a distribution of brightness in the picture Pv and uses the calculation result to determine a region of object OBJ that exhibits such a change CH. This region is referred to as a "second region" A2. The calculation unit 22 then calculates which part of the first region A1 overlaps with the second region A2, thereby obtaining a calculation result A3. This calculation result A3 represents a part of the object OBJ which satisfies both the two conditions noted above for the object's shape and the reflection-light distribution.

The calculation result A3 is fed back to the real device 10, so that the operator can teach the real device 10 in a more efficient way. For example, the operator may be able to adjust the source 25 while viewing the calculation result A3, thus providing an appropriate luminous energy level more easily. The calculation result A3 may particularly be useful for a novice operator to move and orient the object OBJ such that an intended surface of the object OBJ is entirely illuminated.

The first embodiment has been discussed above. Note that the above first embodiment is not limited by the illustrated use of light as an acting factor, but may similarly work with other acting factors as well. The next part of the description will now be directed to a more specific embodiment.

2. SECOND EMBODIMENT

Part 2 of the description describes a second embodiment and its variations with reference to FIGS. 2 to 28.

2-1. System

Figure 2:
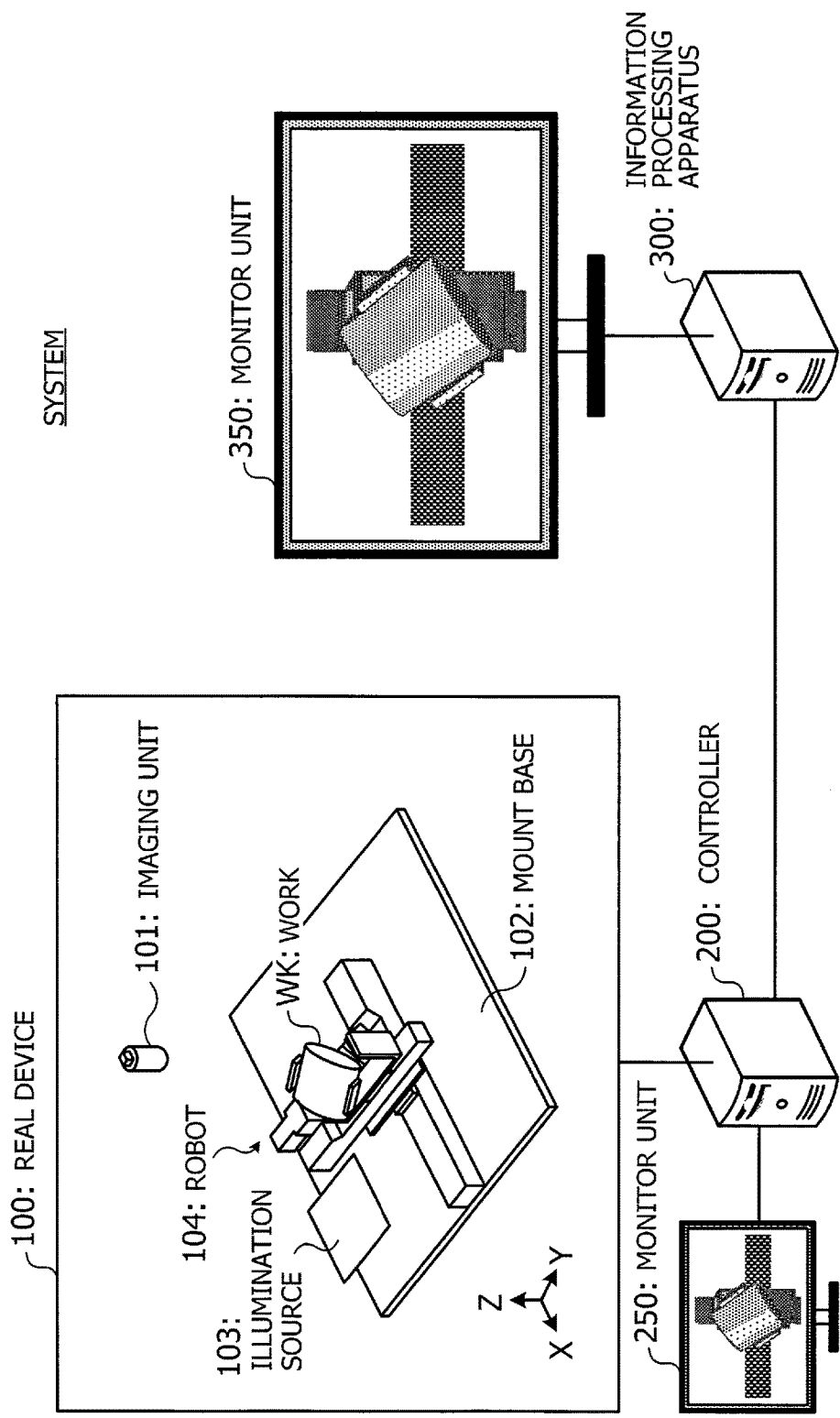
FIG. 2 illustrates an example of a system according to a second embodiment.

Referring first to FIG. 2, a system according to the second embodiment will be described below. FIG. 2 illustrates an example of a system according to the second embodiment. This system includes a real device 100, a controller 200, an information processing apparatus 300, and monitor units 250 and 350.

The illustrated real device 100 includes an imaging unit 101, a mount base 102, an illumination source 103, and a robot 104. These components are operated under the control of a controller 200. The imaging unit 101 is an image-capturing device directed to a region containing a work WK loaded on the robot 104. For example, the imaging unit 101 may be formed from an optical system including lenses, an image sensor using charge-coupled device (CCD) or complementary metal-oxide semiconductor (CMOS) technologies, and an imaging processor for analog-to-digital conversion, digital signal processing, and other data operation.

The mount base 102 is a base structure for placing the illumination source 103 and robot 104. The illumination source 103 is a light source located above the mount base 102 to illuminate a region where the work WK is placed on the robot 104. The robot 104 is a mechanical structure for grasping the work WK and changing its position and orientation as desired.

The real device 100 is used to inspect, for example, the condition of a surface of the work WK. More specifically, the real device 100 casts light with a particular illumination pattern (e.g., mesh) on the work WK and captures an image of the work WK with a reflection of the illumination pattern. The captured image is then subjected to a geometric analysis about the reflected illumination pattern seen on the work WK so as to detect possible defects (e.g., scratches and dents) on its surface.

Note that works are not always simple in shape, but may have a three-dimensional surface that would reflect the illumination pattern toward different directions. When the latter is true for the work WK, the illumination pattern can be seen in a limited part of the current picture, making it difficult to fully inspect the whole surface of the work WK with a single picture. This is why the robot 104 is included in the real device 100. The robot 104 changes the position and posture of the work WK, such that the imaging unit 101 can capture its images from different angles. The resulting pictures taken with various positions and postures of the work WK enable analyzing the illumination pattern in a larger area of its surface. The second embodiment thus assumes that the robot 104 changes the position and posture of the work WK during inspection. However, it would also be possible to configure the real device 100 to change the position and posture of the imaging unit 101 while the work WK is stationary.

As described above, the real device 100 is capable of taking pictures of a work WK of interest from different angles to obtain different inspection view fields. The choice of inspection view fields is made by a human operator. It is difficult, however, for a human operator to exactly remember previous view fields once the position or posture of the work WK are changed. For this reason, the operator could accidentally skip some part of the work WK during its inspection, or would otherwise take a long time to complete the inspection because of overly duplicated inspection view fields that the operator specified in an attempt to ensure a full test coverage. The second embodiment avoids these problems by incorporating into the system a mechanism for an operator to easily recognize a previous inspection view field.

Referring again to FIG. 2, the real device 100 operates under the control of the controller 200. The controller 200 is connected to an information processing apparatus 300 via a communication link. For example, the controller 200 uses socket communication to send the information processing apparatus 300 control data for the real device 100. The controller 200 also has its monitor unit 250. The monitor unit 250 is a display device, such as a cathode ray tube (CRT), liquid crystal display (LCD), plasma display panel (PDP), and electro-luminescence display (ELD). The controller 200 uses this monitor unit 250 to display pictures taken by the imaging unit 101, so that the operator manipulates the system while viewing these pictures.

The information processing apparatus 300 holds 3D CAD data of the real device 100 and uses it to create a virtual device that represents the real device 100 in a virtual space. The information processing apparatus 300 receives control data for the real device 100 and simulates how the virtual device operates in accordance with the received control data. The information processing apparatus 300 calculates what region of a surface of the work WK is seen as the inspection view field and informs the controller 200 of the calculated work surface region.

The information processing apparatus 300 is coupled to its local monitor unit 350, which may be a CRT, LCD, PDP, ELD, or other type of display device. The information processing apparatus 300 uses this monitor unit 350 to display a picture of the work WK that has virtually been taken in the virtual device. The work surface region calculated above is overlaid on this picture, so that the operator can see the region over the picture on the monitor unit 350. The information processing apparatus 300 further converts the work surface region into 3D CAD data and maintains the information in that form. When requested, the information on the work surface region is sent to the controller 200 and displayed on its local monitor unit 250 as an additional image overlaid on a real device picture.

An exemplary system according to the second embodiment has been described above. While the description has assumed the use of reflection of a certain illumination pattern as part of an exemplary inspection method, the second embodiment is not limited by that assumption; the proposed system may also be used with other inspection methods. The next part of the description will discuss hardware, functions, and process flows relating to the devices constituting the proposed system of the second embodiment.

2-2. Hardware

Figure 3:
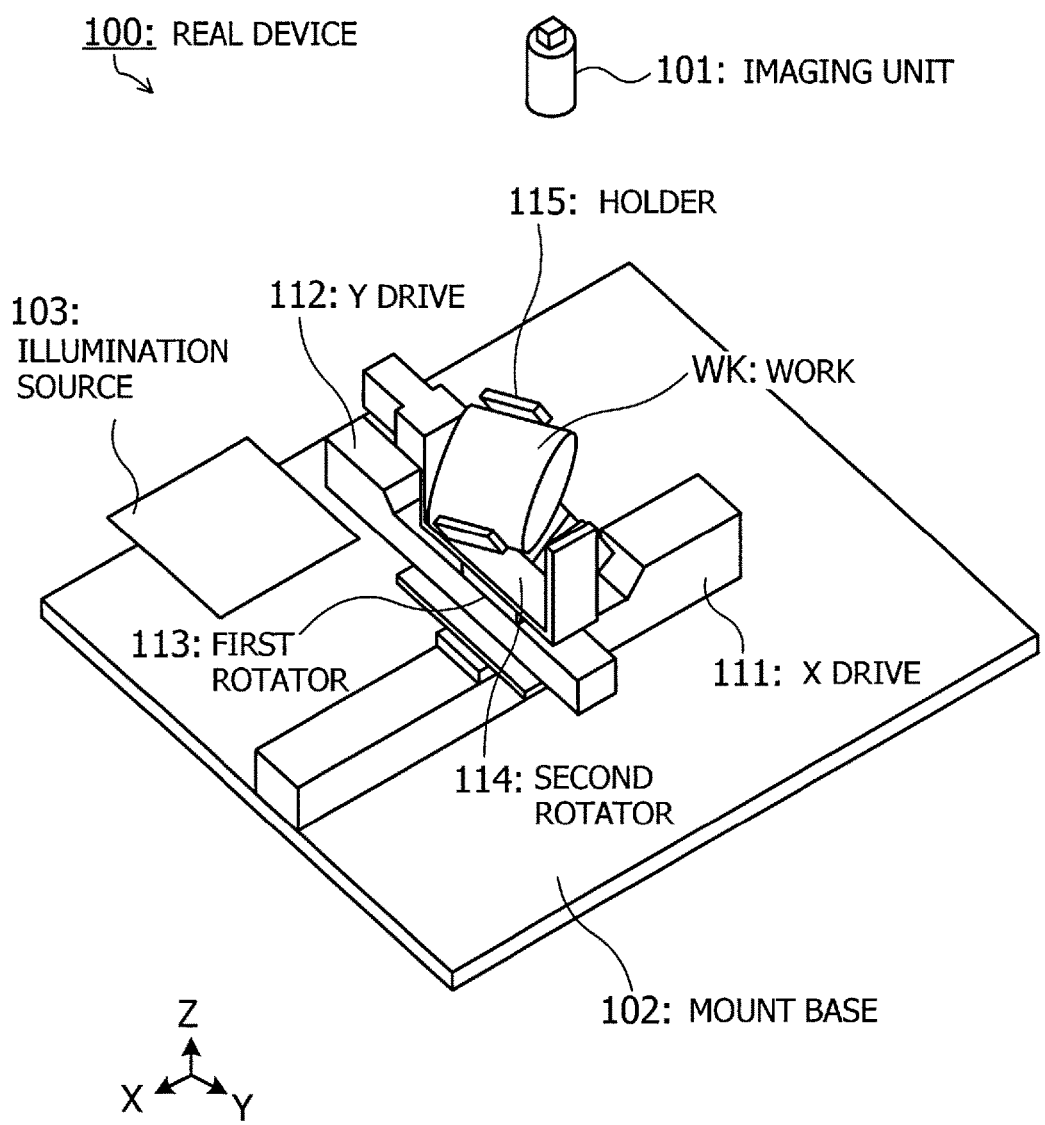
FIG. 3 illustrates an example of a real device according to the second embodiment.
Figure 4:
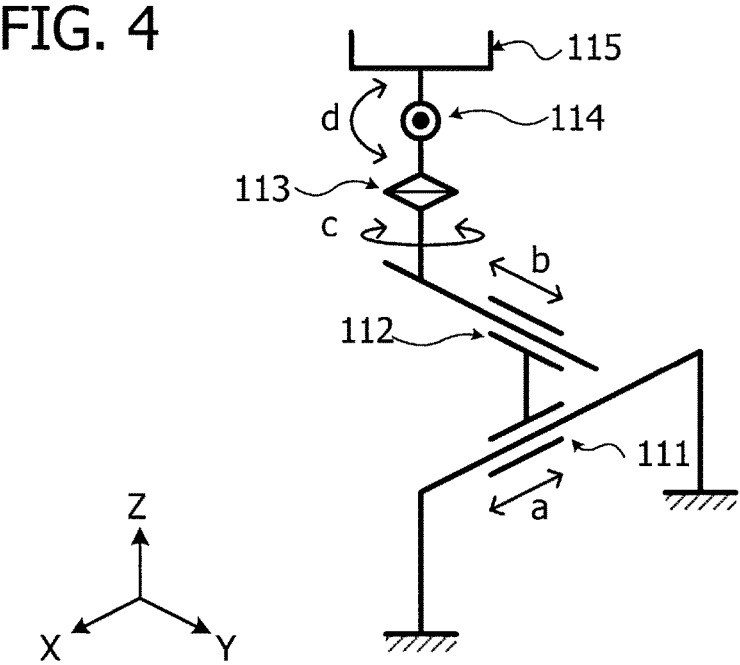
FIG. 4 explains a mechanical aspect of the real device according to the second embodiment.
Figure 5:
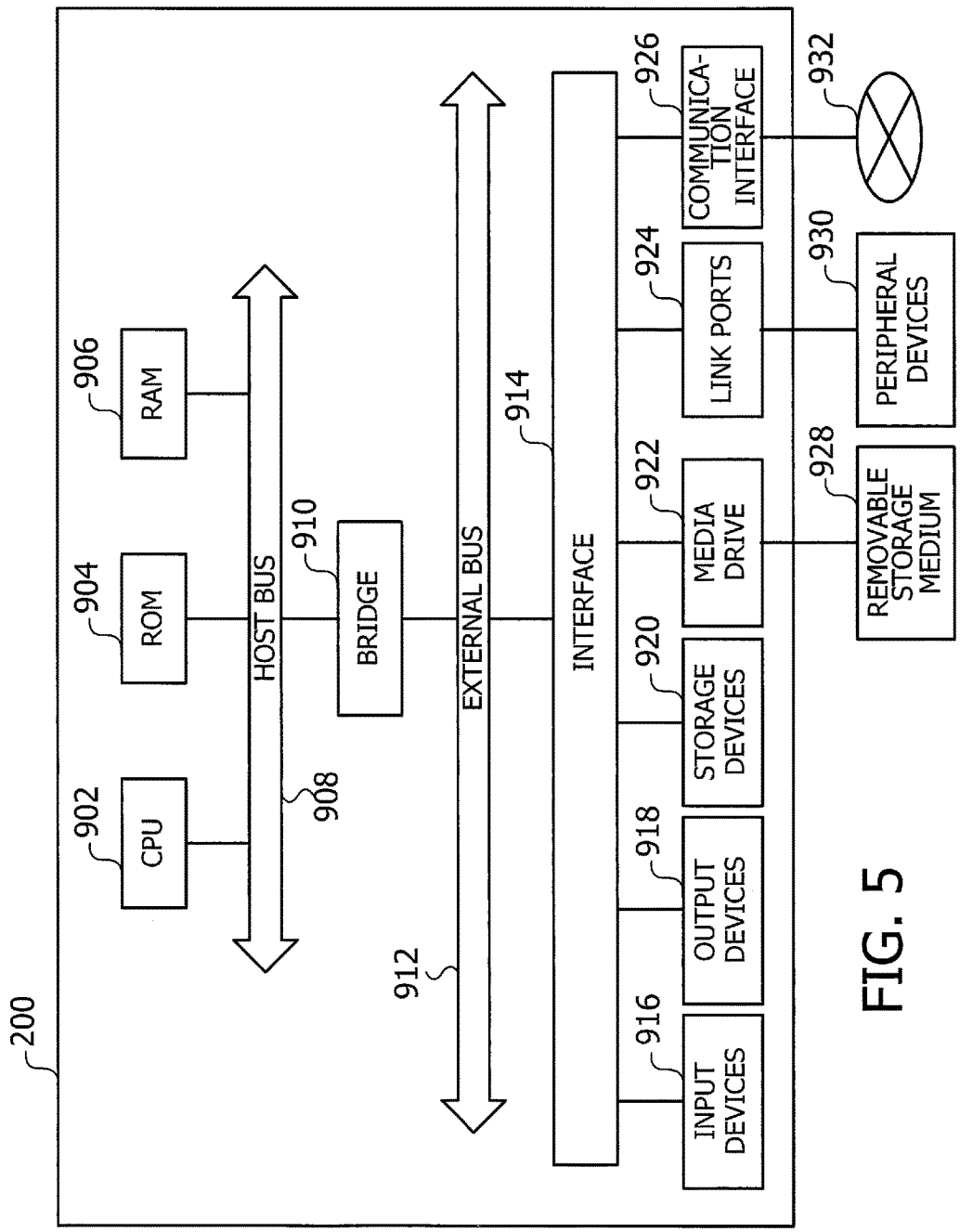
FIG. 5 explains a hardware configuration of a controller according to the second embodiment.

Referring to FIGS. 3 to 5, this section describes hardware of devices involved in the system according to the second embodiment. FIG. 3 illustrates an example of a real device according to the second embodiment, and FIG. 4 explains a mechanical aspect of the real device. FIG. 5 explains a hardware configuration of a controller according to the second embodiment.

(a) Real Device Hardware

The real device 100 has a hardware structure illustrated in FIGS. 3 and 4. Referring first to FIG. 3, the illustrated real device 100 includes the following components: an imaging unit 101, a mount base 102, an illumination source 103, an X drive 111, a Y drive 112, a first rotator 113, a second rotator 114, and a holder 115. The X drive 111, Y drive 112, first rotator 113, second rotator 114, and holder 115 form an example of a mechanism for holding and moving a work under inspection.

More specifically, the mount base 102 is where the X drive 111 is fixed, and the Y drive 112 is placed on the X drive 111. The first rotator 113 is mounted on the Y drive 112. The second rotator 114, mounted on the first rotator 113, has a holder 115 that grasps a work WK under inspection.

Referring next to FIG. 4, the X drive 111 is a moving mechanism designed to move in the X-axis direction as indicated by arrow "a." A motion of this X drive 111 also changes X-axis positions of all the Y drive 112, first rotator 113, second rotator 114, holder 115, and work WK (not illustrated in FIG. 4). The Y drive 112 is a moving mechanism designed to move in the Y-axis direction as indicated by arrow "b" in FIG. 4. A motion of this Y drive 112 changes Y-axis positions of all the first rotator 113, second rotator 114, holder 115, and work WK.

The first rotator 113 rotates about an axis perpendicular to the X-Y plane as indicated by arrow "c" in FIG. 4. A rotation of this first rotator 113 also changes the second rotator 114, holder 115, and work WK in their orientations on the X-Y plane. The second rotator 114 rotates about an axis on the X-Y plane as indicated by arrow "d" in FIG. 4, so that the holder 115 inclines relative to the Z-axis. A rotation of this second rotator 114 directly causes a tilt of the holder 115 and work WK with respect to the Z axis.

With the above-described mechanism, the X drive 111 and Y drive 112 change the position of the work WK on the X-Y plane, while the first rotator 113 and second rotator 114 change the posture of the work WK. These movements and rotations will change what is seen in a captured picture. It is possible, in other words, to vary the inspection view field as desired by controlling motion of the X drive 111, Y drive 112, first rotator 113, and second rotator 114.

(b) Hardware of Controller and Information Processing Apparatus

The controller 200 has a hardware configuration illustrated in FIG. 5. Various functions of the controller 200 are implemented by using computer hardware resources seen in FIG. 5. In other words, these functions are implemented as computer programs that control the hardware system illustrated in FIG. 5.

The hardware system of FIG. 5 includes, among others, a CPU 902, a read-only memory (ROM) 904, a RAM 906, a host bus 908, and a bridge 910. Here the CPU 902 functions as a processor or controller that entirely or partly controls the operation of other components in the controller 200 on the basis of various programs stored in the ROM 904, RAM 906, storage devices 920, or removable storage medium 928 (described later). The ROM 904 is an example of a storage device for programs and data that the CPU 902 may read and manipulate. The RAM 906 serves as a temporary or permanent storage space for programs that the CPU 902 may read, as well as for various parameters and other data that may be changed during execution of those programs.

For example, the CPU 902, ROM 904, and RAM 906 are connected to each other via a host bus 908 that provides high-speed data transfer capabilities. Also connected to the host bus 908 is a bridge 910 for communication with an external bus 912 having a relatively low data transfer speed.

The hardware of FIG. 5 further includes an interface 914 coupled to the external bus 912 for the purpose of connecting the following components: input devices 916, output devices 918, storage devices 920, a media drive 922, link ports 924, and a communication interface 926. For example, input devices 916 may include, for example, a mouse, a keyboard, a touchscreen, a touchpad, buttons, switches, levers, or any combination of these devices. The input devices 916 may also include a remote controller capable of sending out control signals as infrared or radio waves.

The output devices 918 include, for example, a video output device that generates video signals for a monitor unit (e.g., CRT, LCD, PDP, ELD). Other possible devices are audio outputs (e.g., speaker, headphone) and printers. These output devices 918 are capable of providing the user with visual or audio information.

The storage devices 920 include, for example, a magnetic storage device (e.g., HDD) used to store various data. Semiconductor storage devices, such as solid state drives (SSD) and RAM disks, may also be used as the storage devices 920. Other possible types include optical storage devices and magneto-optical storage devices.

The media drive 922 is used to read data from or write data into a removable storage medium 928 that is inserted. Such removable storage media 928 include, for example, magnetic disks, optical discs, magneto-optical discs, and semiconductor memory devices.

The link ports 924 may be, for example, a Universal Serial Bus (USB) port, IEEE-1394 port, Small Computer System Interface (SCSI) port, RS-232C port, optical audio terminal, or any combination of these. The link ports 924 are used to connect peripheral devices 930 such as a printer.

The communication interface 926 is a device that offers a connection to a network 932. The communication interface 926 may be, for example, a communication circuit for wired or wireless local area network (LAN) or Wireless USB (WUSB) link. Other examples include a communication circuit or router for optical networks, a communication circuit or router for asymmetric digital subscriber line (ADSL) links, and a communication circuit for mobile phone networks. The network 932 may be a wired or wireless network, such as the Internet, LAN, broadcast network, and satellite communications system.

An example of hardware of the controller 200 has been described above. The same hardware configuration may similarly be used to implement functions of the information processing apparatus 300 described later. Accordingly, no details of hardware will be discussed separately for the information processing apparatus 300.

2-3. Functions in Controller

Figure 6:
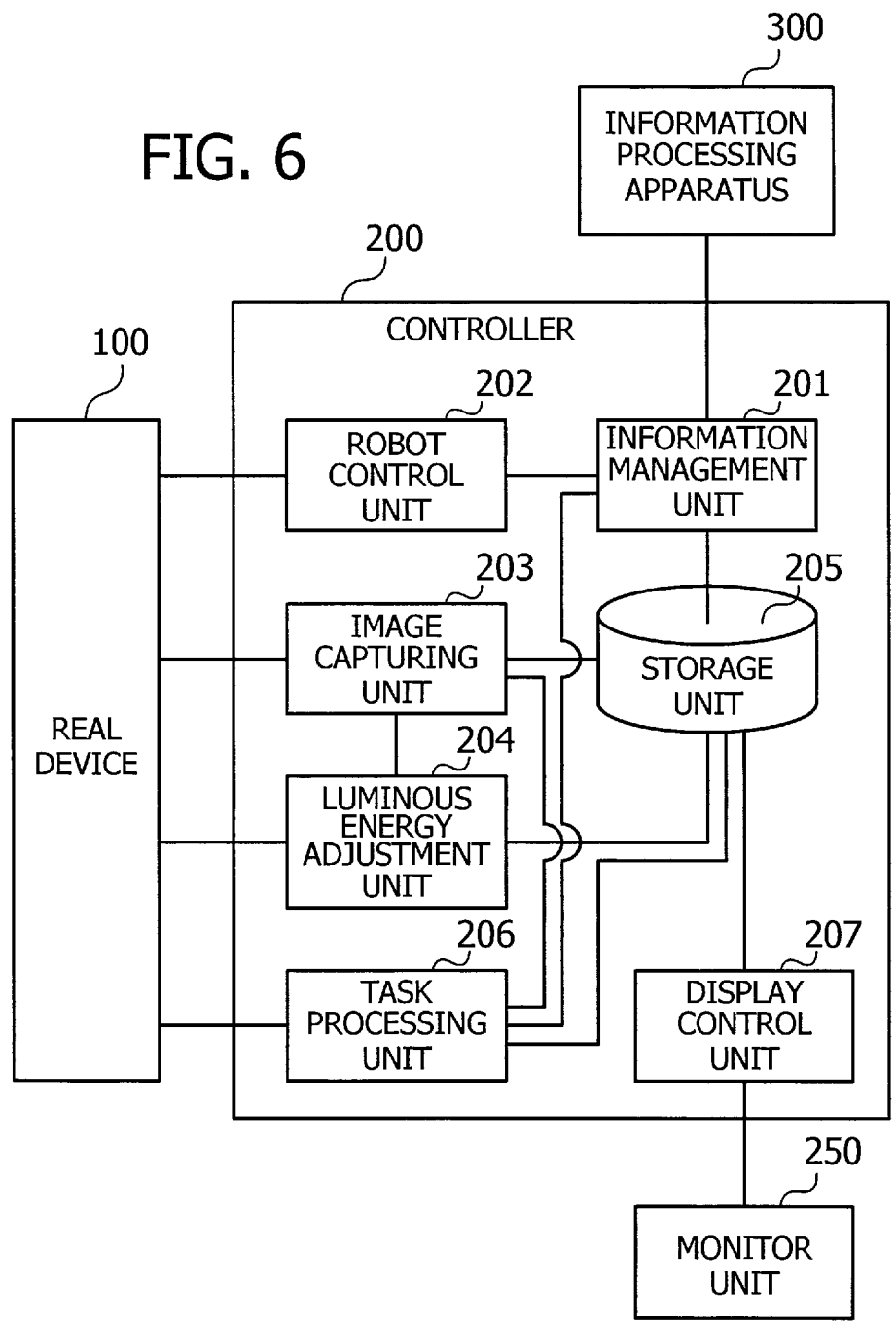
FIG. 6 is a block diagram explaining functions of the controller according to the second embodiment.

Referring now to FIG. 6, this section describes functions of the controller 200. FIG. 6 is a block diagram illustrating functions of a controller according to the second embodiment. The illustrated controller 200 includes an information management unit 201, a robot control unit 202, an image capturing unit 203, a luminous energy adjustment unit 204, a storage unit 205, a task processing unit 206, and a display control unit 207. The functions of the information management unit 201, robot control unit 202, image capturing unit 203, luminous energy adjustment unit 204, task processing unit 206, and display control unit 207 may be implemented by using the CPU 902 and the like discussed in the previous section. The storage unit 205 may be implemented as part of the previously discussed RAM 906 or storage devices 920.

The information management unit 201 receives input information entered by the operator. This information is then delivered from the information management unit 201 to the robot control unit 202, luminous energy adjustment unit 204, and task processing unit 206. The robot control unit 202 controls the foregoing robot 104 (FIG. 2) by sending first control data to the real device 100 according to the input information sent from the information management unit 201. The robot control unit 202 also enters the same first control data to the information management unit 201. The information management unit 201 forwards this first control data to the information processing apparatus 300.

The image capturing unit 203 receives a picture taken by the imaging unit 101 in the real device 100 and stores the received picture in the storage unit 205. The luminous energy adjustment unit 204 controls luminous energy levels of the illumination source 103 according to information from the information management unit 201. This control is done by sending the real device 100 second control data for the illumination source 103. The luminous energy adjustment unit 204 also provides the same second control data to the information management unit 201. The information management unit 201 then forwards it to the information processing apparatus 300. This second control data, as well as the first control data, is also stored in the storage unit 205.

The information management unit 201 further receives information about inspection view fields calculated by the information processing apparatus 300. This view field information is then stored into the storage unit 205 for use by the luminous energy adjustment unit 204 to control the illumination source 103 (FIG. 3) and produce an adjusted luminous energy level. With this adjusted luminous energy level, the task processing unit 206 carries out a procedure specified by the operator. For example, the task processing unit 206 analyzes an illumination pattern obtained as a reflection on the work WK in the current inspection view field, with a luminous energy level adjusted for that view field.

The display control unit 207 reads out a picture stored in the storage unit 205 and displays it on a screen of a local monitor unit 250. The display control unit 207 may also display a range of an inspection view field on the monitor unit 250 if the storage unit 205 stores information about it. This is done by overlaying an additional visual image on the existing picture in the monitor screen. For example, the display control unit 207 overlays on the picture a region representing a past inspection view filed that the task processing unit 206 has already done. As will be described later, the information processing apparatus 300 produces information indicating such a region and transmits it to the information management unit 201.

Functions implemented in the controller 200 have been described above. The next section will describe those in the information processing apparatus 300.

2-4. Functions in Information Processing Apparatus

Figure 7:
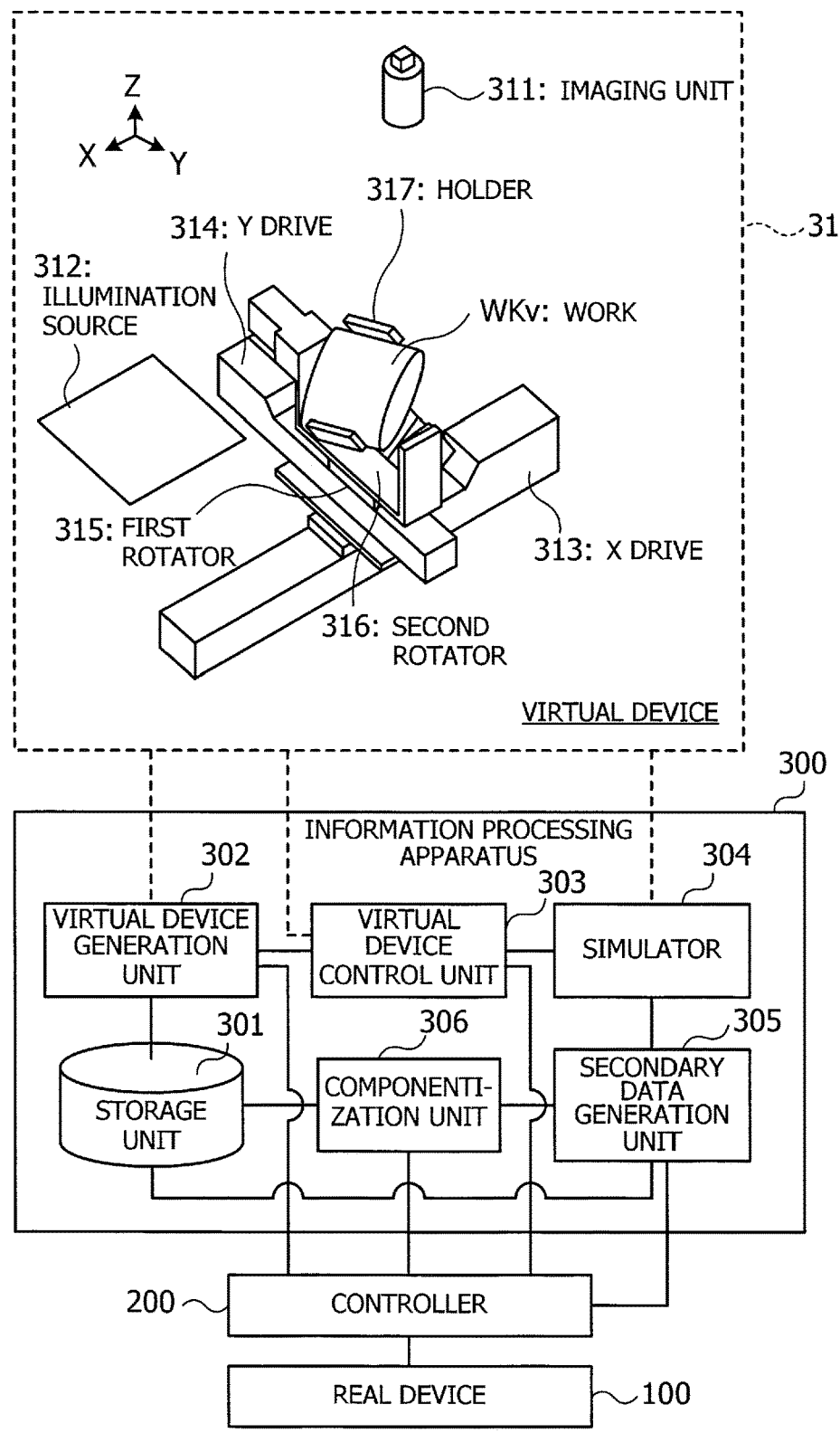
FIG. 7 is a block diagram explaining functions of an information processing apparatus according to the second embodiment.

Referring now to FIG. 7, this section describes what functions are included in the information processing apparatus 300. FIG. 7 is a block diagram explaining functions of an information processing apparatus according to the second embodiment. The illustrated information processing apparatus 300 includes a storage unit 301, a virtual device generation unit 302, a virtual device control unit 303, a simulator 304, a secondary data generation unit 305, and a componentization unit 306. Functions of the virtual device generation unit 302, virtual device control unit 303, simulator 304, secondary data generation unit 305, and componentization unit 306 may be implemented by using the CPU 902 and the like discussed above in FIG. 5. The storage unit 301 may be implemented as part of the previously discussed RAM 906 or storage devices 920 in FIG. 5.

The storage unit 301 is where 3D CAD data of the real device 100 is stored. The virtual device generation unit 302 reads this 3D CAD data from the storage unit 301 and uses it to produce a virtual device 310 representing the real device 100 in a virtual space. The virtual device 310 includes an imaging unit 311, an illumination 312, an X drive 313, a Y drive 314, a first rotator 315, a second rotator 316, and a holder 317. A work WK may have been placed in the real device 100. The virtual device generation unit 302 thus consults the controller 200 to obtain information about such a work and virtually produces a work WKv held in the virtual device 310.

The resulting data of the virtual device 310 is then supplied from the virtual device generation unit 302 to the virtual device control unit 303. The virtual device control unit 303 operates the virtual device 310 by, for example, moving the virtual device 310 just as the real device 100 moves, with reference to first control data and second control data received from the controller 200. This motion of the virtual device 310 is entered to the simulator 304 as part of input data.

The simulator 304 executes a simulation described below in the environment of the virtual device 310. For example, the simulator 304 executes an optical simulation about the light that the illumination 312 produces and calculates a picture representing what the imaging unit 311 would see in its field of view. For this picture, the simulator 304 may use ray tracing, radiosity, photon mapping, environment mapping, or other kind of rendering method. The picture is then passed to the secondary data generation unit 305. In response, the secondary data generation unit 305 calculates in what surface region of the work WKv the illumination is reflected. This region will be referred to as a "reflection region." The secondary data generation unit 305 also calculates which part of the work surface has to be removed from the inspection view field. The secondary data generation unit 305 then produces secondary data by removing the calculated part from the reflection region.

The resulting secondary data is then transmitted from the secondary data generation unit 305 to the controller 200. The secondary data permits the controller 200 to, for example, adjust the luminous energy level according to an area on the work WKv that corresponds to the inspection view field. The secondary data generation unit 305 also sends its produced secondary data to the componentization unit 306. The secondary data actually describes a two-dimensional image corresponding to a partial region of the work WKv seen in the picture. The componentization unit 306 converts this secondary data into 3D CAD data form, thereby producing a piece of component data. The componentization unit 306 stores this component data into the storage unit 301.

The componentization unit 306 reads the component data out of the storage unit 301 and calculates which region of the picture corresponds to the component data. The componentization unit 306 then sends secondary data indicating the calculated region to the controller 200. Suppose, for example, that the work WKv has changed its posture. In this case, the componentization unit 306 reads previous component data from the storage unit 301 and converts that component data into a region of the current picture taken in the virtual device 310. The componentization unit 306 then sends secondary data indicating the calculated region to the controller 200. The controller 200 then displays the received secondary data as an overlay on the current picture of the real device 100, so that the operator may understand the precise range that was inspected before the posture change.

Functions implemented in the information processing apparatus 300 have been described above. The next section will describe what processes the system of the second embodiment performs.

2-5. Process Flows

Referring to FIGS. 8 to 11, this section describes process flows executed by the system of the second embodiment. The description may also use FIGS. 12 to 19, as needed, for additional explanation about the functions of the controller 200 and information processing apparatus 300.

Figure 8:
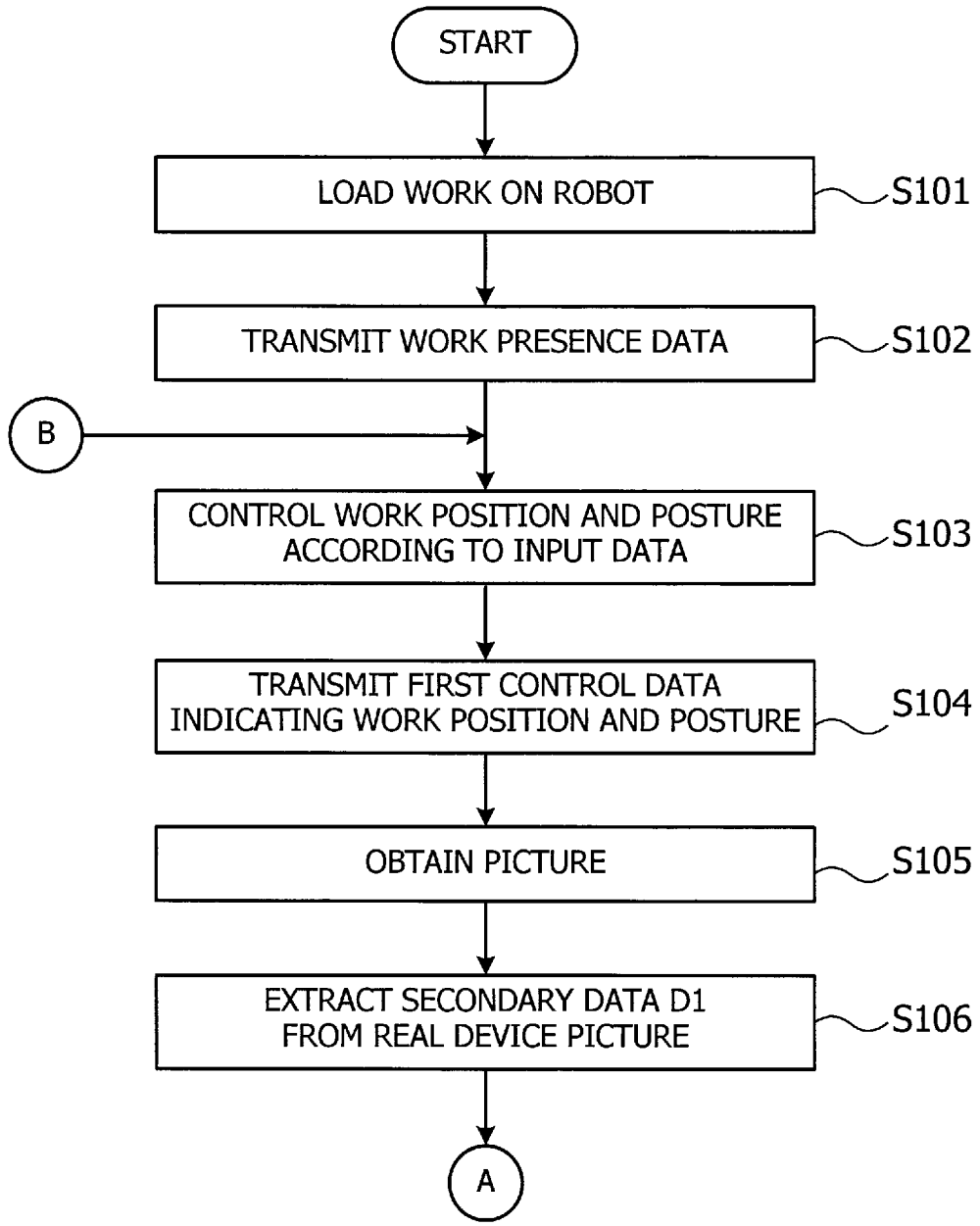
FIGS. 8 and 9 are first and second parts of a flowchart illustrating a process flow in the real device according to the second embodiment.
Figure 9:
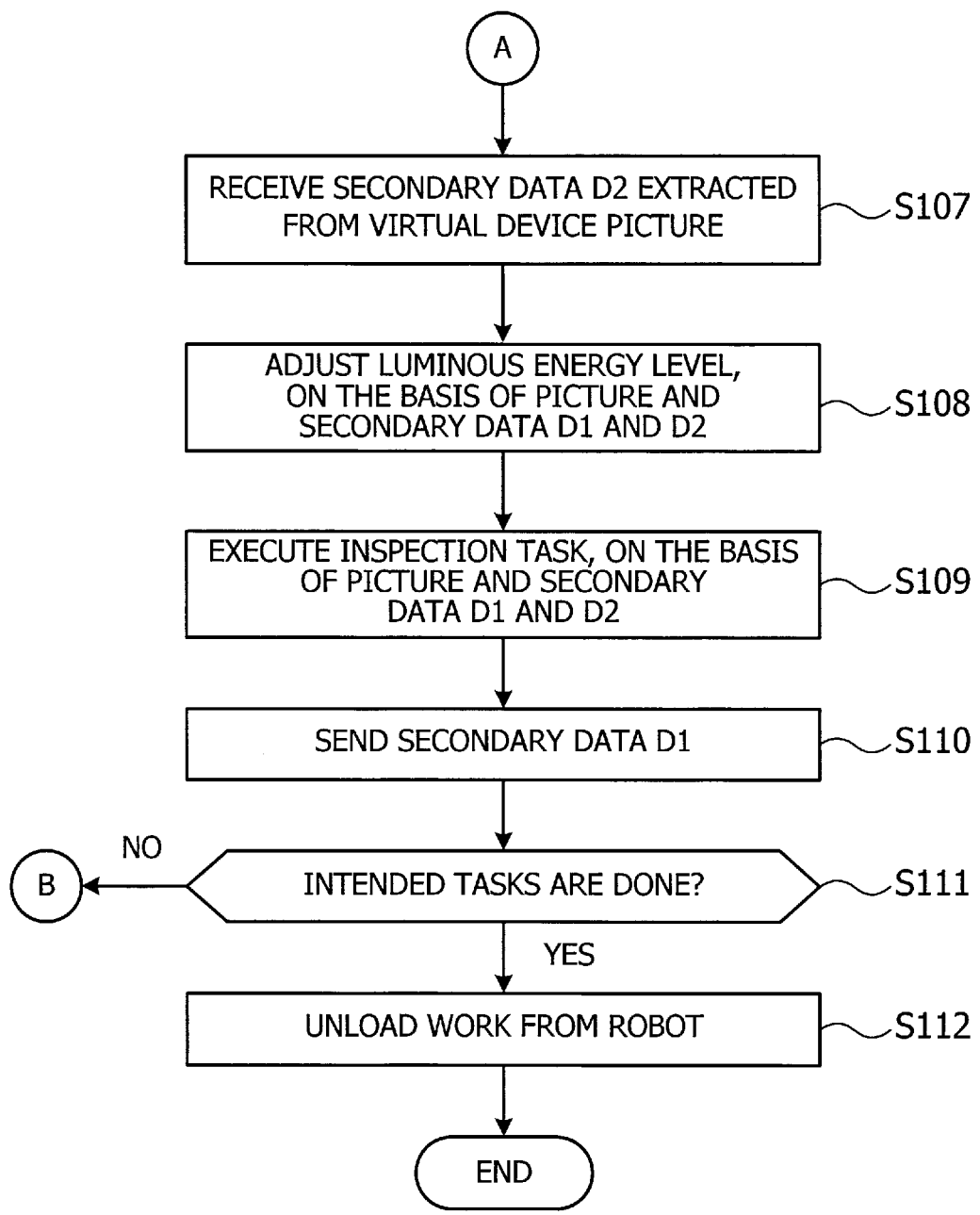
Figure 10:
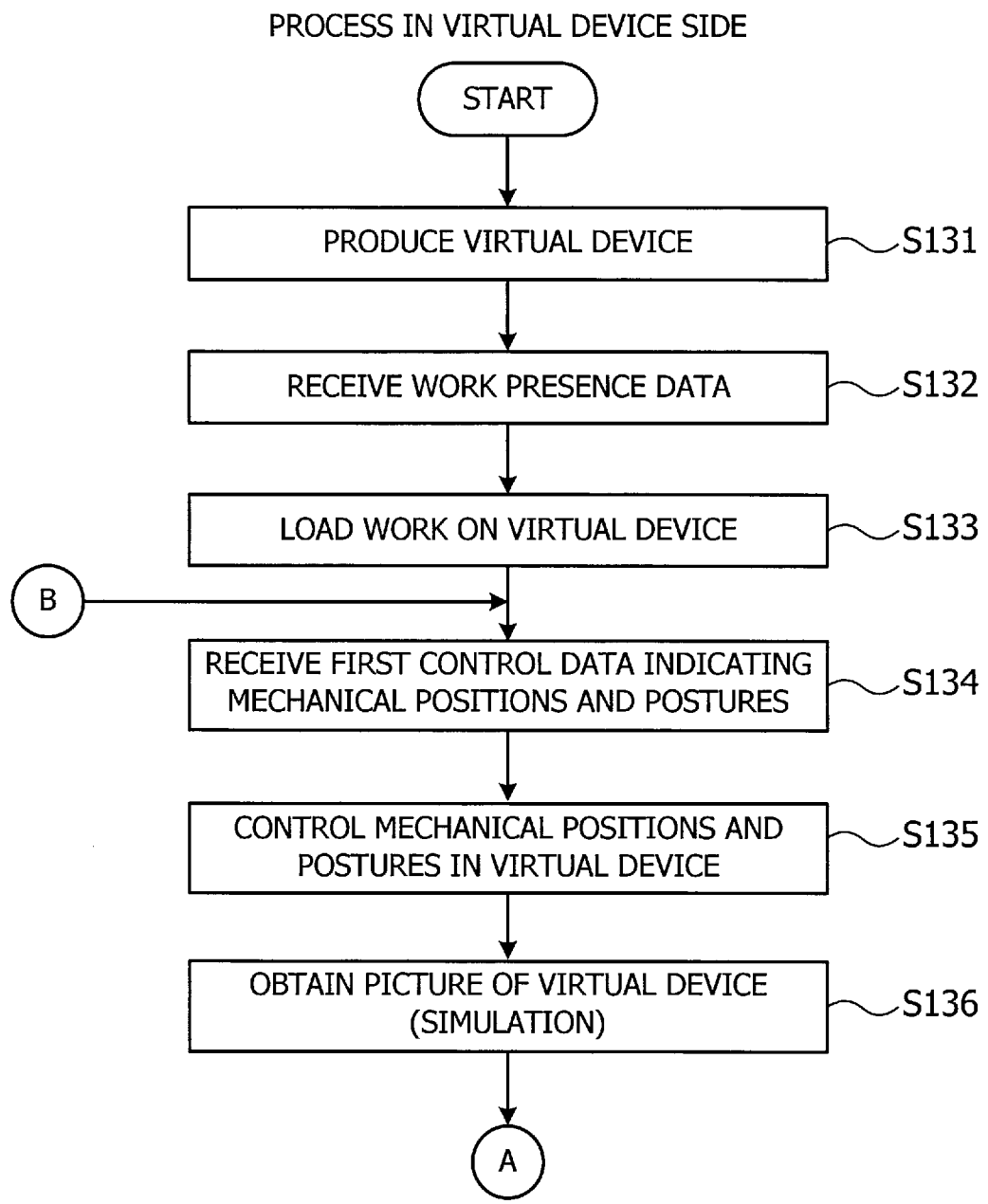
FIGS. 10 and 11 are first and second parts of a flowchart illustrating a process flow in a virtual device according to the second embodiment.
Figure 11:
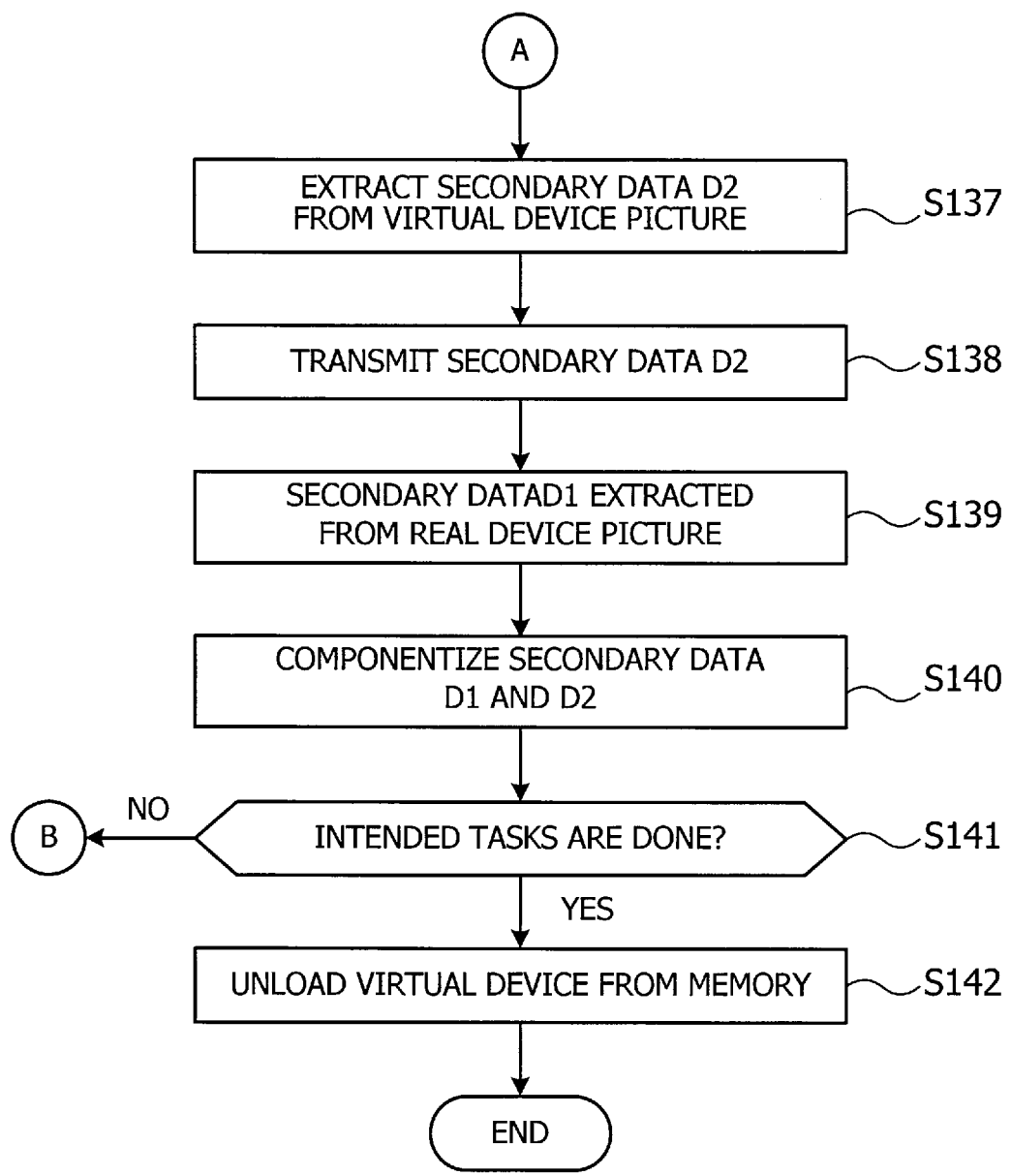

Specifically, FIGS. 8 and 9 are first and second parts of a flowchart illustrating a process flow in the real device according to the second embodiment. FIGS. 10 and 11 are first and second parts of a flowchart illustrating a process flow in the virtual device according to the second embodiment. Note that the following description may use the term "real device side" to refer to the real device 100 and controller 200 and the term "virtual device side" to refer to the information processing apparatus 300.

(a) Process Flow in Real Device Side

A process performed in the real device side will be described below with reference to FIGS. 8 and 9. Note that the following process is mainly performed by the real device 100 and controller 200.

(S101) A work WK is loaded on the robot 104 in the real device 100. This fact may be detected automatically by the real device 100, and its information goes to the controller 200. Alternatively, the operator may enter such information to the controller 200 after the work WK is set. This information indicates the presence of a work WK and is thus called "work presence data." The work presence data also contains an identifier for determining what type of work is actually held in the robot 104.

(S102) The information management unit 201 in the controller 200 transmits the received work presence data to the information processing apparatus 300. This work presence data of the work WK enables the information processing apparatus 300 to produce a virtual device 310 with a virtual work WKv.

(S103) The controller 200 receives input data for position and posture control of the robot 104 in the real device 100, and the robot control unit 202 controls the robot 104 accordingly. For example, the operator may specify some specific positions for the X drive 111 and Y drive 112, as well as rotation angles for the first rotator 113 and second rotator 114. The robot control unit 202 moves the robot 104 according to the specified positions and angles. The robot control unit 202 stores such robot control data in the storage unit 205.

(S104) The information management unit 201 in the controller 200 sends first control data to the information processing apparatus 300 to indicate the current position and posture of each movable part of the robot 104 in the real device 100. This first control data enables the information processing apparatus 300 to control the virtual device 310, particularly in its X drive 313, Y drive 314, first rotator 315, and second rotator 316.

Figure 12:
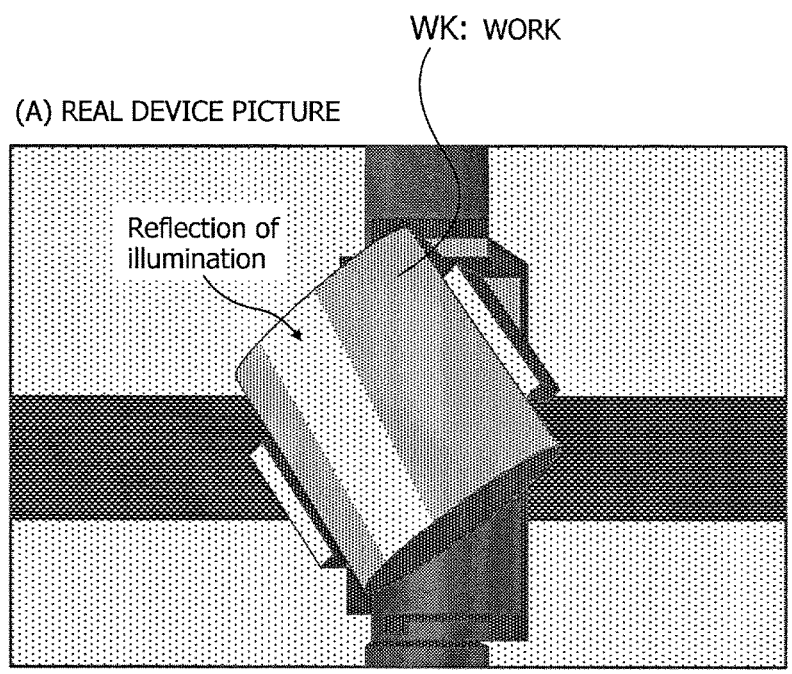
FIG. 12 explains a picture taken in the real device according to the second embodiment.

(S105) The image capturing unit 203 in the controller 200 obtains a picture taken by the imaging unit 101 in the real device 100. For example, the image capturing unit 203 receives a picture illustrated in FIG. 12. FIG. 12 explains a picture taken in the real device 100 according to the second embodiment. As can be seen from this picture, the work WK has a bright surface region in which the illumination is reflected. In addition to the work WK, the picture contains some partial images of the robot 104. Actually the robot 104 in the picture has some portions that are as bright as the illumination-reflecting surface region of the work WK. In contrast, the bottom surface of the work WK is seen as a dark plane in the picture.

As mentioned previously, the work WK is inspected with reference to an illumination pattern reflected on its surface. In other words, the inspection view field is a part of the work surface where an illumination pattern is reflected. The illumination source 103 has therefore to be adjusted in its luminous energy level so that the imaging unit 101 can capture a proper image of the reflection of an illumination pattern.

If it was possible to detect the place of an intended reflection by using image processing techniques on a picture, the adjustment of the luminous energy level would be done automatically to optimize the amount of reflection light in that place. However, such automatic adjustment is difficult to achieve with a simple image processing technique because the picture draws some portions of the robot 104 with a similar brightness to the reflection on the work WK. The image of the work WK may also include a portion that have to be removed from the inspection view field for other reasons. In view of these things, the controller 200 executes the processing steps described below.

(S106) The information management unit 201 extracts secondary data D1 from the picture taken by the imaging unit 101 in the real device 100. For example, the work WK may have some silk screen prints on its surface. The work WK may also have some holes for collecting sound. The information management unit 201 extracts these things and removes their regions from the work surface seen in the picture, thereby producing secondary data D1 that indicates the remaining effective areas for inspection. See, for example, FIG. 18. Here the operator may specify which part to extract and remove. The process then moves to step S107 in FIG. 9 after step S106 is finished.

(S107) The information management unit 201 then receives secondary data D2 that the information processing apparatus 300 has extracted from a picture virtually taken in the virtual device 310. This secondary data D2 represents an inspection view field that the information processing apparatus 300 has calculated in consideration of the shape of the work WK and a reflection of the illumination. The calculation method used for secondary data D2 will be described in detail later as part of a process flow in the virtual device side.

(S108) The luminous energy adjustment unit 204 in the controller 200 adjusts luminous energy level of the illumination source 103 on the basis of the picture and secondary data D1 and D2. For example, there are several stepwise values previously determined for the adjustment, and the luminous energy adjustment unit 204 selects one of those values that produces illumination on the inspection view field at a proper optical intensity. The luminous energy adjustment unit 204 may be designed to check a picture each time a new luminous energy level is applied, and calculate a proper luminous energy level by using an extrapolation or interpolation method so as to optimize the amount of reflection light in the inspection view field. The adjusted luminous energy level is then recorded in the storage unit 205.

As can be seen from the above, the proposed system uses secondary data D1 and D2 to properly narrow down the inspection view field and adjust the luminous energy level automatically. The proposed techniques contribute to an automated teaching process with a better accuracy, and even a novice operator can adjust luminous energy levels for inspection. The automated adjustment is also expected to reduce the teaching time.

(S109) The task processing unit 206 in the controller 200 executes an inspection-related task as instructed by the operator. This task can be done in preferable conditions since step S108 has optimized the luminous energy level of the illumination source 103. The display control unit 207 in the controller 200 may overlay the inspection view field information on the pictures during the inspection, on the basis of secondary data D1 and D2. The overlaid information will help the operator keep track of the inspection range and thus perform his or her work more efficiently.

(S110) The controller 200 transmits secondary data D1 from the information management unit 201 to the information processing apparatus 300. The information processing apparatus 300 converts this secondary data D1 into 3D CAD data form and stores the result as a piece of component data. The componentization makes it easier to calculate a region of the work WK that corresponds to the secondary data D1 even after the work WK has changed its position or posture. Details of this componentization process will be described later as part of a process flow in the virtual device side.

(S111, S112) The process goes to step S112 when all intended tasks have been done. Otherwise, the process returns to step S103 in FIG. 8. In step S112, the operator unloads the work WK, thus closing the process of FIGS. 8 and 9.

An example process flow has been described above for the real device side. The next section will discuss the same for the virtual device side.

(b) Process Flow in Virtual Device Side

Referring now to FIGS. 10 and 11, a process performed in the virtual device side will be described below. Note that the following process is mainly performed by the information processing apparatus 300.

(S131, S132) The virtual device generation unit 302 reads out 3D CAD data of the real device 100 from the storage unit 301 and produces a virtual device 310 on the basis of that data. The virtual device generation unit 302 then receives work presence data of a specific work WK from the controller 200.

(S133) The received work presence data indicates what type of work has been loaded on the real device 100. The virtual device generation unit 302 thus identifies what the work WK and then retrieves 3D CAD data of that work WK from the storage unit 301. Based on the retrieved 3D CAD data, the virtual device generation unit 302 virtually produces and loads a work WKv on the virtual device 310.

(S134, S135) The virtual device control unit 303 receives first control data that indicates the position and posture of each movable part of the real device 100. Based on this first control data, the virtual device control unit 303 controls the position and posture of each movable part of the virtual device 310. That is, the virtual device control unit 303 controls the virtual device 310 so that its mechanisms take the same positions and postures as their counterparts in the real device 100. Such first control data may be transmitted from the controller 200 in a realtime fashion, so that the virtual device control unit 303 may provide a realtime synchronization between the real device 100 and virtual device 310.

Figure 13:
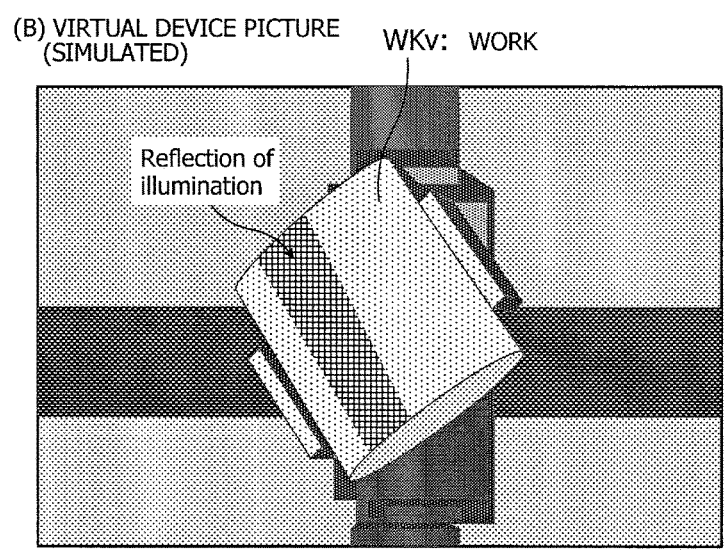
FIG. 13 explains a picture taken in the virtual device according to the second embodiment.

(S136) The simulator 304 obtains a picture representing a view from the imaging unit 311 in the virtual device 310. For example, the simulator 304 may use a ray tracing, radiosity, photon mapping, environment mapping, or other algorithm for rendering a picture of the virtual device 310 as illustrated in FIG. 13. FIG. 13 explains a picture taken in a virtual device according to the second embodiment. This example picture uses darks tone to emphasize reflection of the illumination. For better visibility, a colored picture may be drawn using white for the work WKv and red for the illumination.

More specifically, the simulator 304 according to the second embodiment simulates reflection with a cube mapping method, which is one of the environment mapping algorithms. The simulator 304 first sets the virtual illumination source 312 as what is to be seen as a reflection image on the virtual work surface, since the real illumination source 103 positions such a reflection in the real device 100. The simulator 304 creates an environment map by setting a view point position at the center of gravity of the work WKv. This view point position is used for producing a cube map. The simulator 304 then renders the work WKv and a cube map representing reflection on its surface, from a view point placed at the lens's principal point of the imaging unit 311. In this way, the simulator 304 simulates what is seen in a picture taken by the imaging unit 311.

The process goes to step S137 in FIG. 11 when step S136 is finished.

Figure 14:
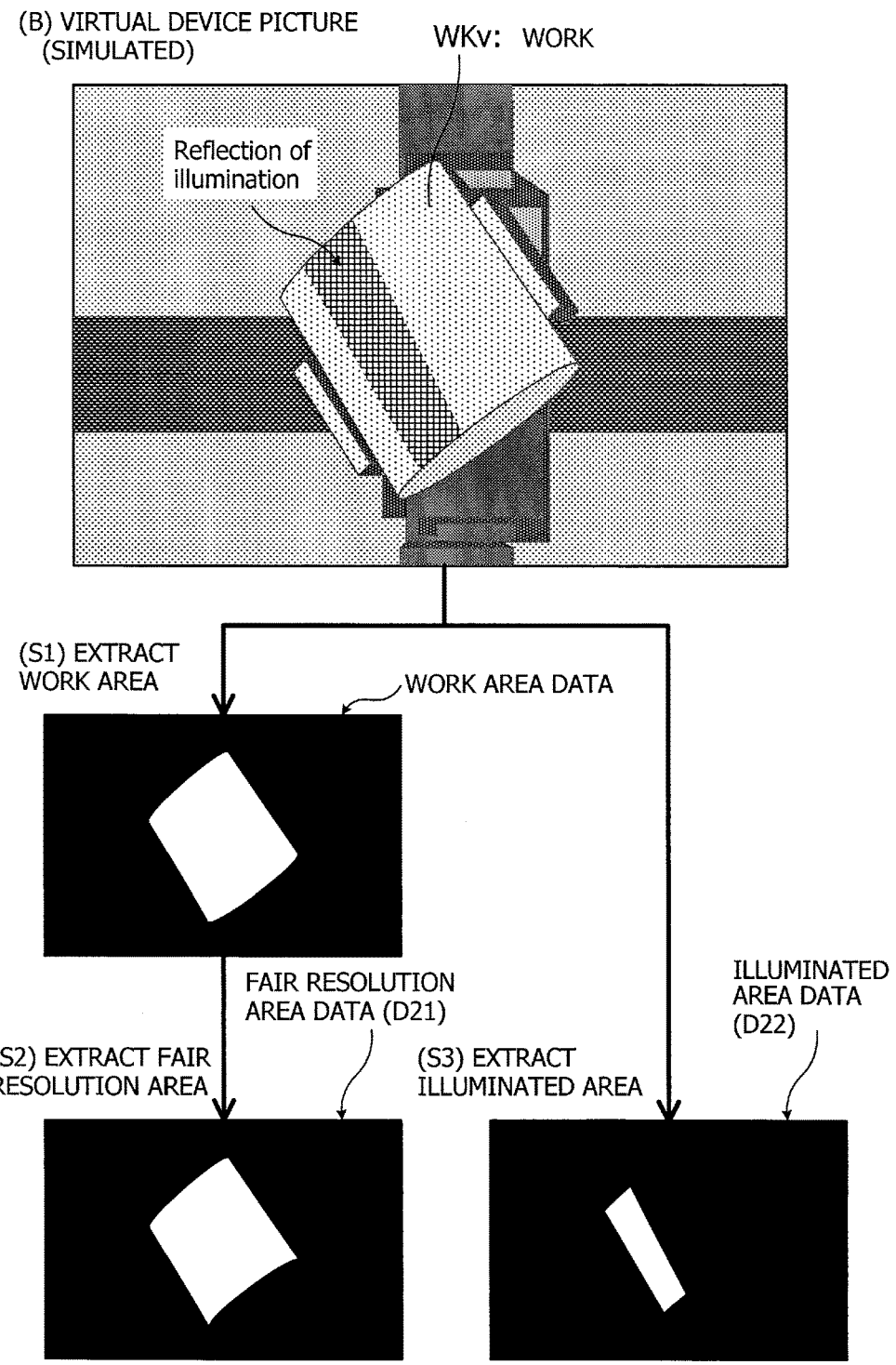
FIG. 14 explains area calculation as a method for calculating secondary data according to the second embodiment.
Figure 15:
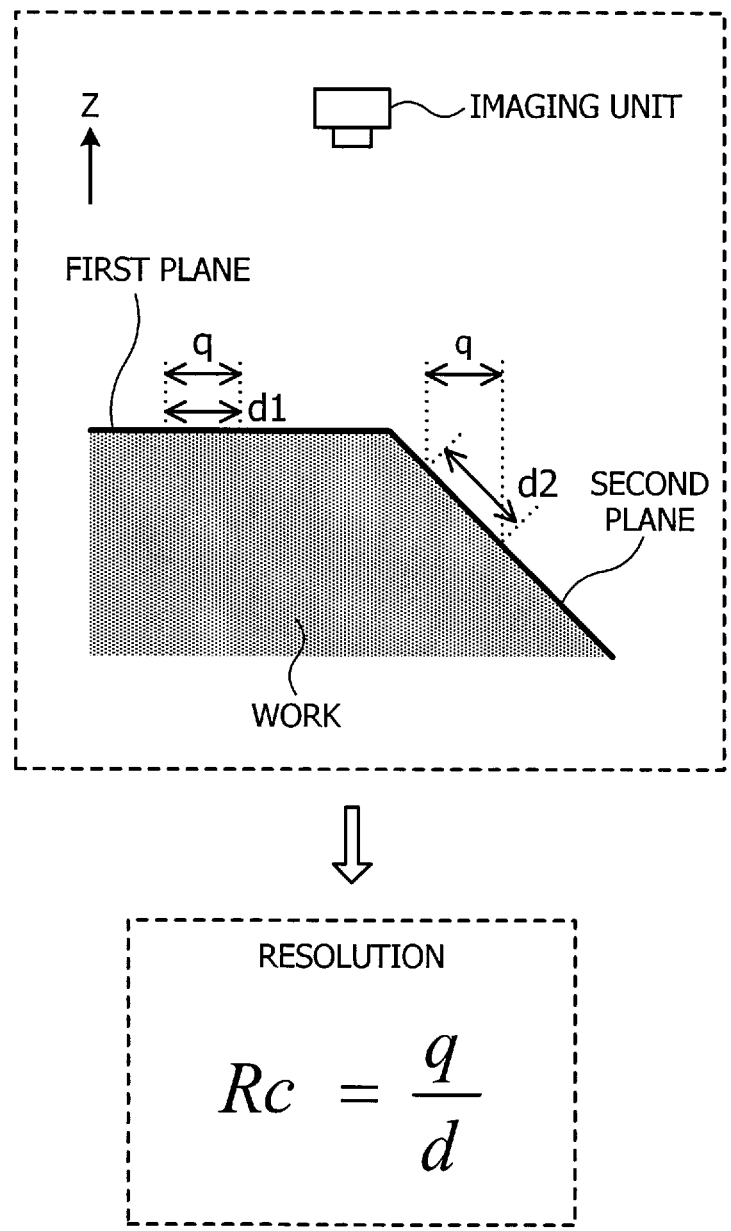
FIG. 15 explains resolution calculation as another method for calculating secondary data according to the second embodiment.
Figure 16:
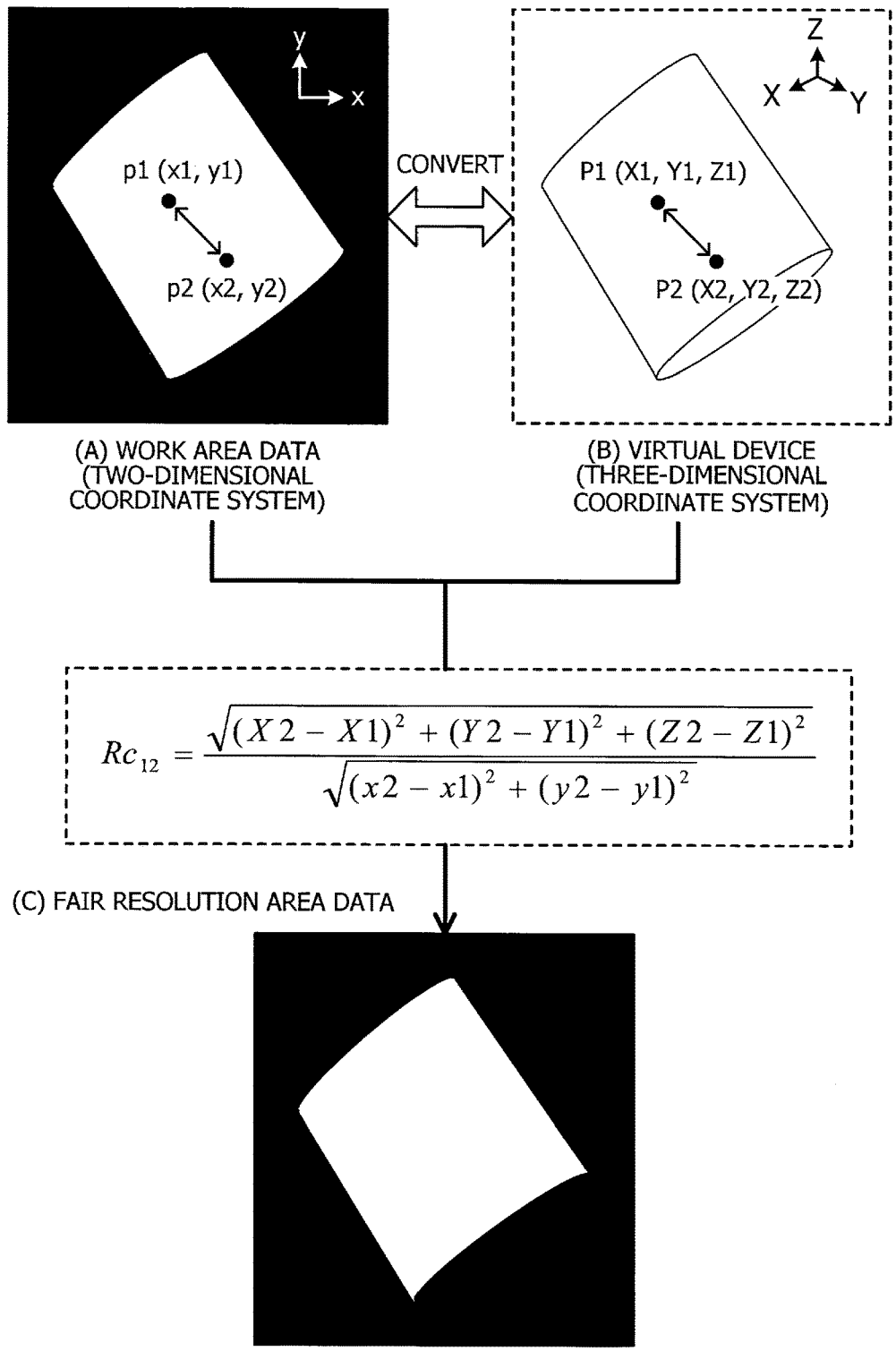
FIG. 16 explains secondary data generation as yet another method for calculating secondary data according to the second embodiment.

(S137, S138) The secondary data generation unit 305 extracts secondary data D2 from the picture of the virtual device 310. An example of this data extraction is illustrated in FIGS. 14 to 16. Specifically, FIG. 14 explains area calculation as a method for calculating secondary data according to the second embodiment. FIG. 15 explains resolution calculation as another method for calculating secondary data according to the second embodiment. FIG. 16 explains secondary data generation as yet another method for calculating secondary data according to the second embodiment.

Referring to FIG. 14, the secondary data generation unit 305 analyzes 3D CAD data of the virtual device 310 and extracts a work area representing the work WKv alone from the picture of the virtual device 310 (S1).

The resulting work area data in FIG. 14 represents the extracted work area in white with a black background. This is an example of how the secondary data generation unit 305 indicates a work area within a picture.

For example, the secondary data generation unit 305 extracts a component that is the closest to the view point, on the basis of each component's depth information obtained when the simulator 304 has rendered the virtual device. If the extracted component is found to be a work WKv under inspection, the secondary data generation unit 305 then gives white to the pixels representing the component and black to all the other pixels, thereby producing work area data. The same processing may be repeated to produce work area data containing a plurality of works.

The secondary data generation unit 305 subsequently extracts a fair resolution area in the work area by identifying a region with higher resolutions (S2). FIG. 15 gives what the "resolution" actually means in this context. An imaging unit and two planes of the work surface are seen in FIG. 15, where the imaging unit is directed to the −Z direction. One plane of the work (first plane) is perpendicular to the Z axis while another plane (second plane) has an oblique angle with respect to the Z axis. Suppose that a series of q pixels in a picture corresponds to a distance d1 on the first plane, while the same number q of pixels corresponds to a distance d2 on the second plane. The first-plane distance d1 is shorter than the second-plane distance d2 because the imaging unit is squarely directed to the first plane.

Resolution Rc is defined to be the quotient of q divided by d, where q is the number of pixels on a picture and d is the corresponding distance on the work surface. First-plane resolution Rc1 is therefore larger than second-plane resolution Rc2. The relationship between a pixel in a picture and its corresponding position on the work is obtained by tracing backward the conversion process performed in rendering three-dimensional coordinates into the picture. This means that, for example, two-dimensional coordinates p1 (x1, y1) and p2 (x2, y2) of work area pixels can be converted to three-dimensional coordinates P1 (X1, Y1, Z1) and P2 (X2, Y2, Z2) of the work WKv in the virtual device 310, and vice versa, in the way illustrated in FIG. 16.

In view of the above, the secondary data generation unit 305 is configured to calculate a resolution Rc12 from two-dimensional coordinates p1 and p2 and three-dimensional coordinates P1 and P2 according to Equation (1) seen below. The secondary data generation unit 305 executes this calculation of resolution Rc12 repeatedly to scan the entire work area. Upper limit RcH and lower limit RcL have previously been determined for the resolution Rc12. In this resolution calculation, each two points may be selected with certain constraints. For example, the two points in the coordinate system have to be different coordinates in either X or Y axis direction, and the two points in the three-dimensional coordinate system have to be different coordinates only in X and Y axis directions. Other possible constraints may restrict the choice of two points in the direction that would significantly affect the inspection results, or in the shape of a work WK, or in the property of the illumination source 103.

$$Rc_{12} = \frac{\sqrt{(X2-X1)^2 + (Y2-Y1)^2 + (Z2-Z1)^2}}{\sqrt{(x2-x1)^2 + (y2-y1)^2}} \quad (1)$$

The secondary data generation unit 305 now extracts each pixel whose resolution Rc12 falls in a range between the upper limit RcH and lower limit RcL. The extracted set of pixels forms a fair resolution area. Referring to the examples of FIGS. 14 and 16, fair resolution area data D21 indicates a fair resolution area with a color of white on the black background. The above-described method of the secondary data generation unit 305 removes low-resolution regions in the work area because they are out of the inspection range. The resulting fair resolution area data D21 is an example of secondary data D2.

The secondary data generation unit 305 further extracts an illuminated area representing a reflection of the illumination (S3). Specifically, the secondary data generation unit 305 extracts red pixels from the picture of the virtual device 310 when a reflection is emphasized with that color. The extracted pixels form an illuminated area. Referring to the examples of FIG. 14, illuminated area data D22 indicates an illuminated area with a color of white on the black background. This illuminated area data D22 is another example of secondary data D2.

Either of the above fair resolution area data D21 and illumination area data D22 may serve alone as secondary data D2. The secondary data generation unit 305, however, extracts an overlapping portion of these two pieces of data and transmits it to the controller 200 as secondary data D2. Based on this secondary data D2, the luminous energy level is adjusted in the real device side as seen in FIG. 17. FIG. 17 explains a method for adjusting luminous energy levels by using secondary data according to the second embodiment.

The secondary data D2 calculated above enables the controller 200 to identify an inspection area Af illustrated in FIG. 17. The adjustment process therefore focuses on this inspection area Af so that an optimal luminous energy level will be set there. As a result of the adjustment, the picture seen in the lower half of FIG. 17 includes some saturation in the luminance. For example, overly white areas AO are seen on the robot 104, and an overly black areas AU is seen in a low-resolution part of the work WK. These saturated areas AO and AU are, however, out of the inspection range and thus make no change in the inspection result. The use of secondary data D2 facilitates the operator to determine which part is out of the inspection range, although it is generally difficult to do it with the image processing alone.

(S139, S140) The componentization unit 306 receives secondary data D1 from the controller 200, which has been extracted from a picture of the real device 100. The componentization unit 306 then converts the secondary data D1 and D2 into 3D CAD data form, thereby producing a piece of component data. For example, the componentization unit 306 calculates an overlap between two regions indicated by the two pieces of secondary data D1 and D2 and then converts the obtained overlap into component data in the form of 3D CAD data.

Figure 18:
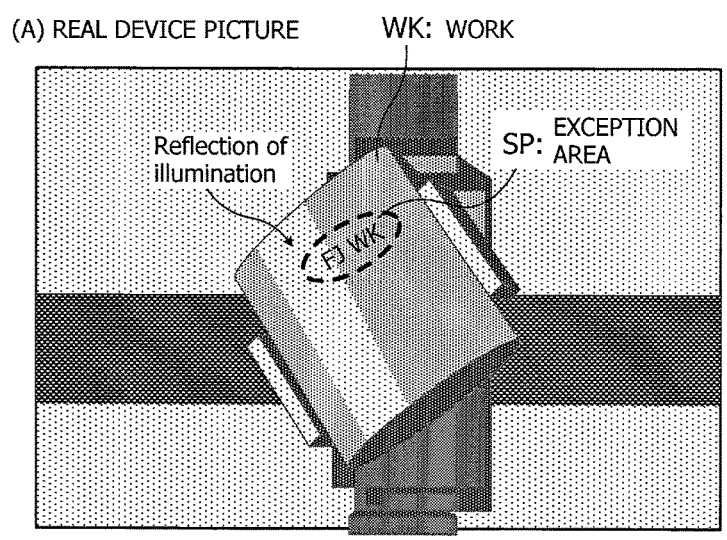

The former secondary data D1 represents a picture region excluding a part that is out of the intended inspection range. For example, the operator specifies an exception area SP seen in FIG. 18 so as to exclude it from the inspection. FIG. 18 is a first diagram that explains area calculation with an exception area as still another method for calculating secondary data according to the second embodiment. In this example, the operator specifies a silk screen print as an exception area SP. Although not depicted in FIG. 18, the operator may also specify a microphone hole bored in the work WK as another exception area SP.

Figure 20:
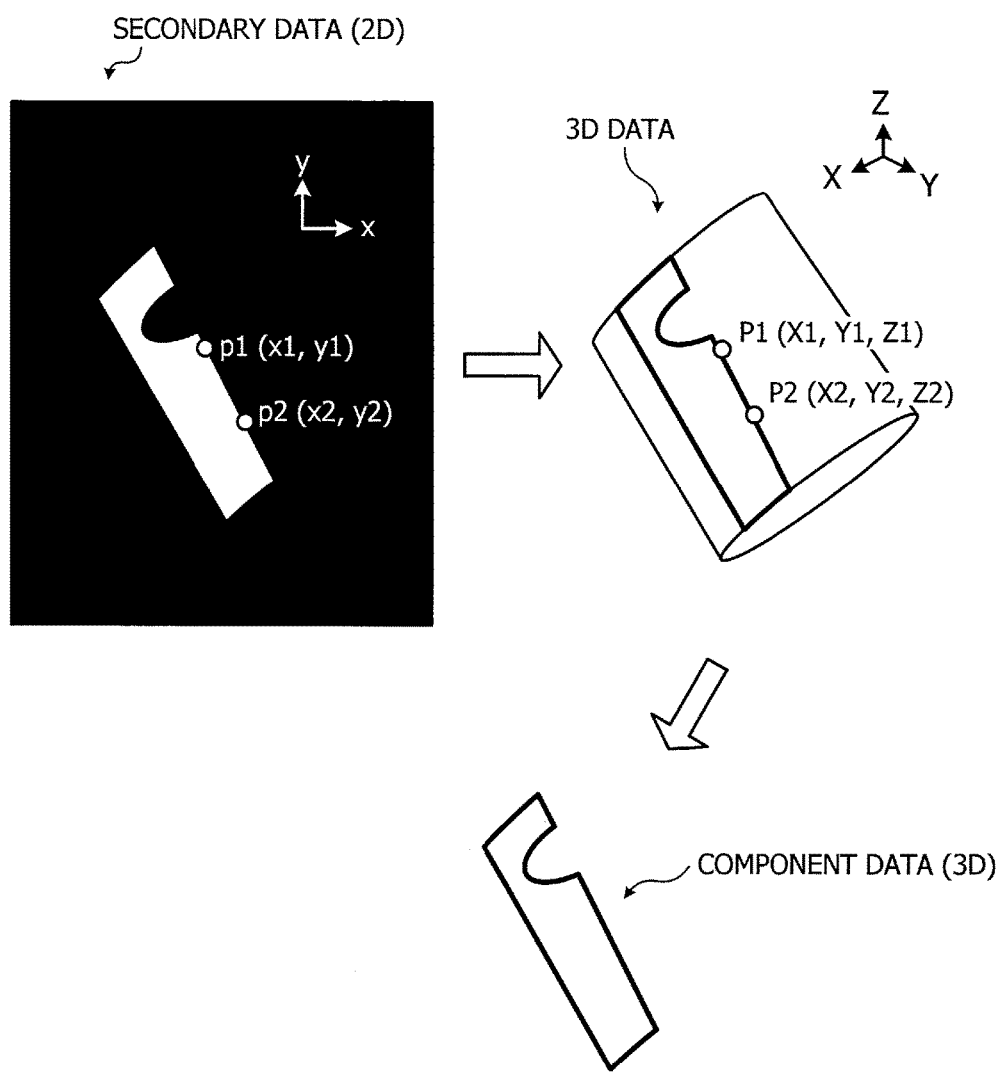
FIG. 20 explains componentization of secondary data according to the second embodiment.

The componentization unit 306 removes such areas specified in the secondary data D1 from the region of secondary data D2, thereby producing another piece of secondary data D25 seen in FIG. 19. FIG. 19 is a second diagram that explains area calculation with an exception area as still another method for calculating secondary data according to the second embodiment. The componentization unit 306 then produces a piece of component data by converting the secondary data D25 into 3D CAD data form. FIG. 20 explains this componentization process for secondary data according to the second embodiment.

As seen in FIG. 20, the original secondary data D25 represents a region in the two-dimensional coordinate system. This secondary data D25 provides a region in a two-dimensional picture that has been taken under certain setup conditions, and it thus contains no three-dimensional information relating to the position or solid geometry of a work WK. For this reason, the region seen in the secondary data D25 would not directly fit into a new picture of the same work WK after a change in the position or posture of the work WK. The original secondary data D25 per se is not usable once the work WK is moved. The componentization unit 306 therefore transforms secondary data D25 into a piece of 3D CAD data so as to make it compatible with a change in the position or posture of the work WK.

As previously mentioned in the description of resolution Rc, it is possible to obtain the relationship between a pixel in a picture and its corresponding position on the work by tracing backward the conversion process performed in rendering three-dimensional coordinates into the picture. For example, the componentization unit 306 converts two-dimensional coordinates p1 (x1, y1), p2 (x2, y2), . . . in the area indicated by secondary data D25 to three-dimensional coordinates P1 (X1, Y1, Z1), P2 (X2, Y2, Z2), . . . in the way illustrated in FIG. 20. Then, based on the obtained three-dimensional coordinates, the componentization unit 306 produces component data in 3D CAD data form.

The componentization unit 306 stores such component data into the storage unit 301 and sends it to the controller 200 as needed. The componentization unit 306 may further convert a group of points in component data into a set of polygons. This polygonal data conversion may be performed with, for example, the Marching Cubes method or Hoppe's method. For details of the Hoppe's method, see Hugues Hoppe et al., "Surface reconstruction from unorganized points," Computer Graphics (SIGGRAPH '92 Proceedings).

(S141, S142) The process goes to step S142 when all intended tasks have been done. Otherwise, the process returns to step S134 in FIG. 10. In step S142, the virtual device generation unit 302 unloads data of the virtual device 310 from memory, thus closing the process discussed in FIGS. 10 and 11.

A process flow in the virtual device side has been described above. The next section will discuss more usage of secondary data.

(c) Usage of Secondary Data

Referring now to FIGS. 21 to 24, this subsection provides supplementary information about other usage of secondary data than the foregoing adjustment of luminous energy levels. For example, secondary data may also be used when the process is continued (i.e., No at step S141 in FIG. 11) with a change in the posture of the work WK.

Figure 21:
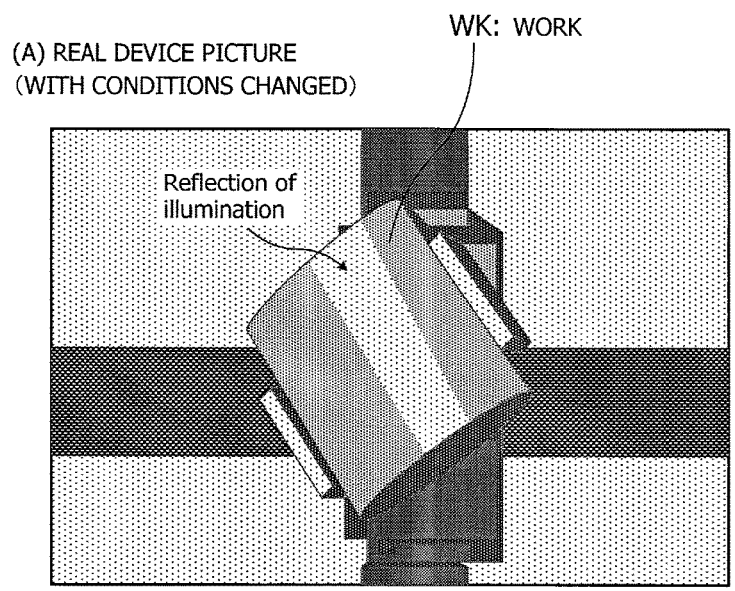
FIGS. 21 to 24 are first to fourth diagrams that explain how to use a componentized version of secondary data.

FIGS. 21 to 24 are first to fourth diagrams that explain how to use a componentized version of secondary data. Specifically, FIG. 21 illustrates a picture taken in the real device 100 with a new posture of the same work WK. The posture of the work WK has been changed by a motion of the robot 104, and that change has affected the location where a reflection of the illumination is seen.

Figure 22:
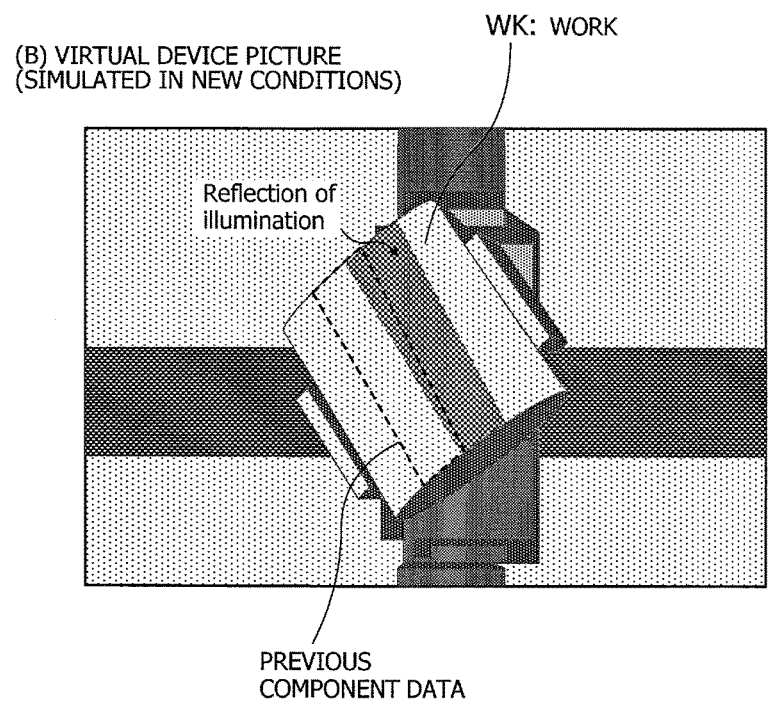

The virtual device control unit 303 controls the virtual device 310 so that its mechanisms take the same positions and postures as their counterparts in the real device 100. Accordingly the simulator 304 repeats simulation with new posture conditions, thus calculating new pictures of the virtual device 310 including a different reflection of the illumination. The virtual device control unit 303 retrieves previous component data from the storage unit 301 and overlays a previous inspection range on a new image of the virtual device 310 as seen in FIG. 22.

Figure 23:
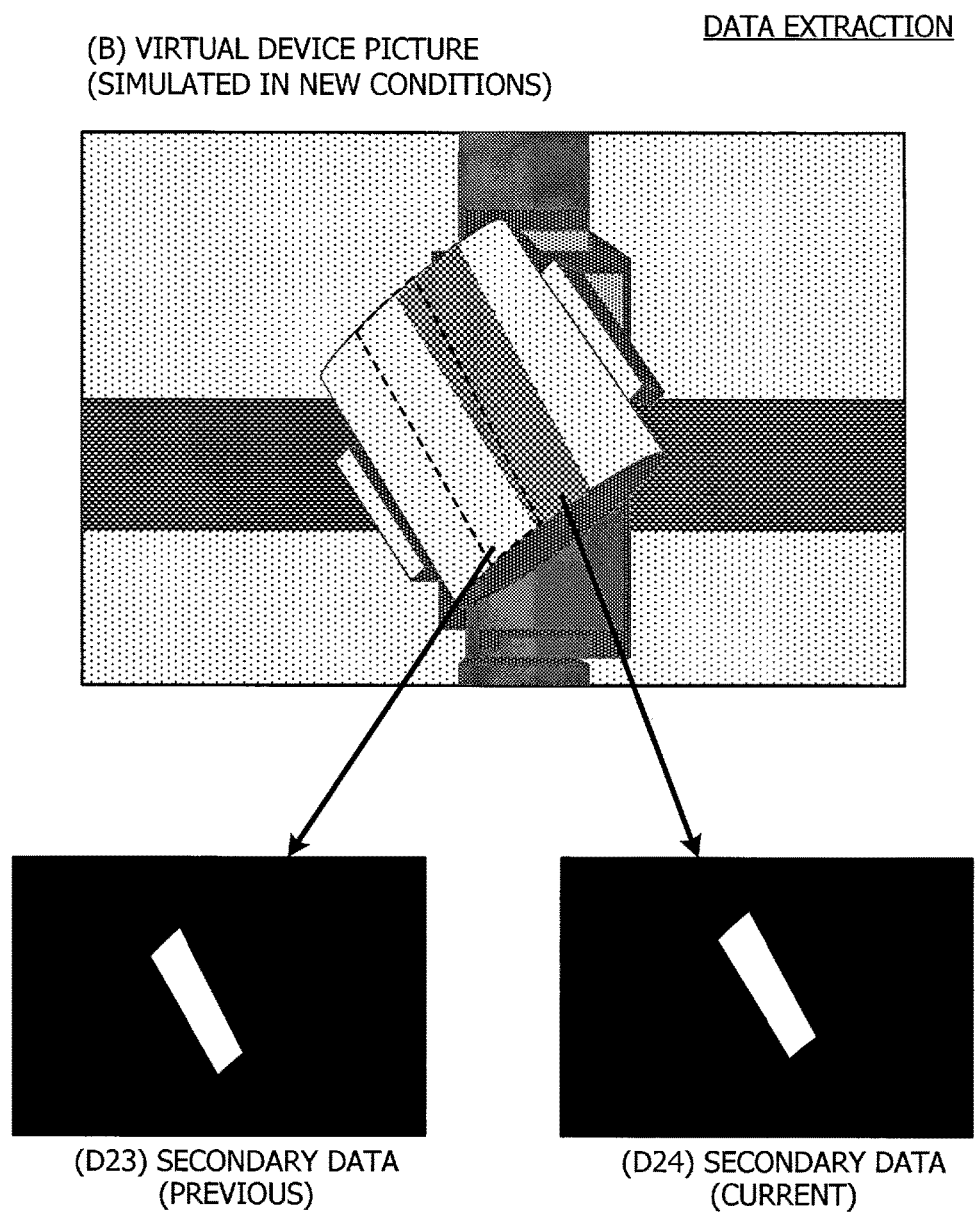
Figure 24:
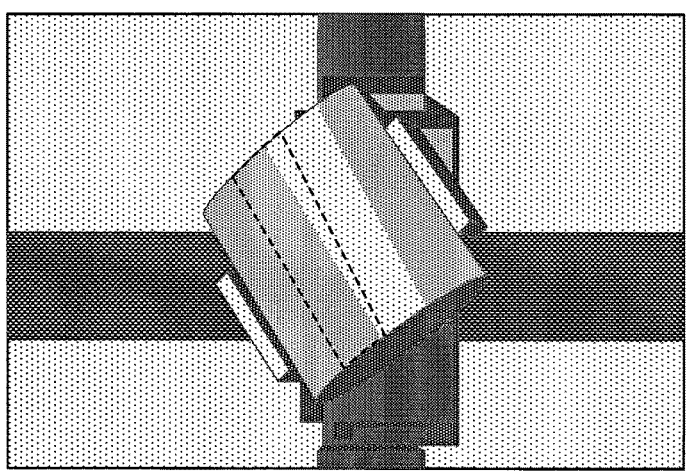

When a posture of the work WK is given, the secondary data generation unit 305 produces secondary data D24 from the picture of the virtual device 310 by using the method discussed previously in FIG. 14. The secondary data generation unit 305 further produces another piece of secondary data D23 as seen in FIG. 23 to overlay the region of past secondary data on the current picture. This secondary data D23 is re-created for the current picture because past secondary data has to appear in different regions in a picture depending on the posture of the work WK.

The produced two pieces of secondary data D23 and D24 are then sent from the secondary data generation unit 305 to the controller 200. In response, the display control unit 207 in the controller 200 displays a picture of the real device 100 on the monitor unit 250, with an overlay of a past inspection range indicated by the secondary data D23 as indicated by the broken-line frame in FIG. 24. Such overlaid images on the display make it easier for the operator to recognize a region that was tested before and choose a new region for inspection not to overlap with the past region as much as possible. In other words, the operator can manipulate the robot 104 to ensure a full test coverage on the work WK while minimizing the overlap between inspection ranges.

Once a new position or posture of the work WK is optimized for inspection, the luminous energy level of the illumination source 103 is automatically adjusted using secondary data during the inspection or teaching. The above-described overlay of an inspection range based on secondary data is applicable to both the real device pictures and virtual device pictures. However, either one of these pictures may omit such overlays depending on the purposes.

The above description has provided an example usage of secondary data in the second embodiment. While the second embodiment has demonstrated how the real device 100, controller 200, and information processing apparatus 300 work together to support configuring and teaching the inspection system by the operator. However, only the information processing apparatus 300 will suffice for a teaching job for positions and postures of a work WK. For example, the information processing apparatus 300 may work alone to simulate a virtual device 310 with various positions or postures of a work WK and calculate their values for achieving a full test coverage of an intended work surface with multiple inspection view fields. The information processing apparatus 300 then sends information about the work positions and postures to the controller 200, so that the real device 100 will be controlled accordingly to provide appropriate view angles for inspection.

2-6. Variation #1 (Bright-Field Illumination)

Figure 25:
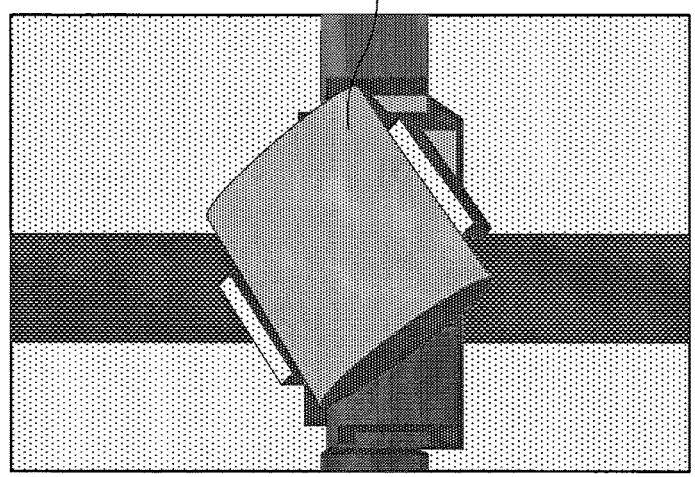
FIGS. 25 and 26 are first and second drawings that explain how to calculate secondary data according to variation #1 of the second embodiment.
Figure 26:
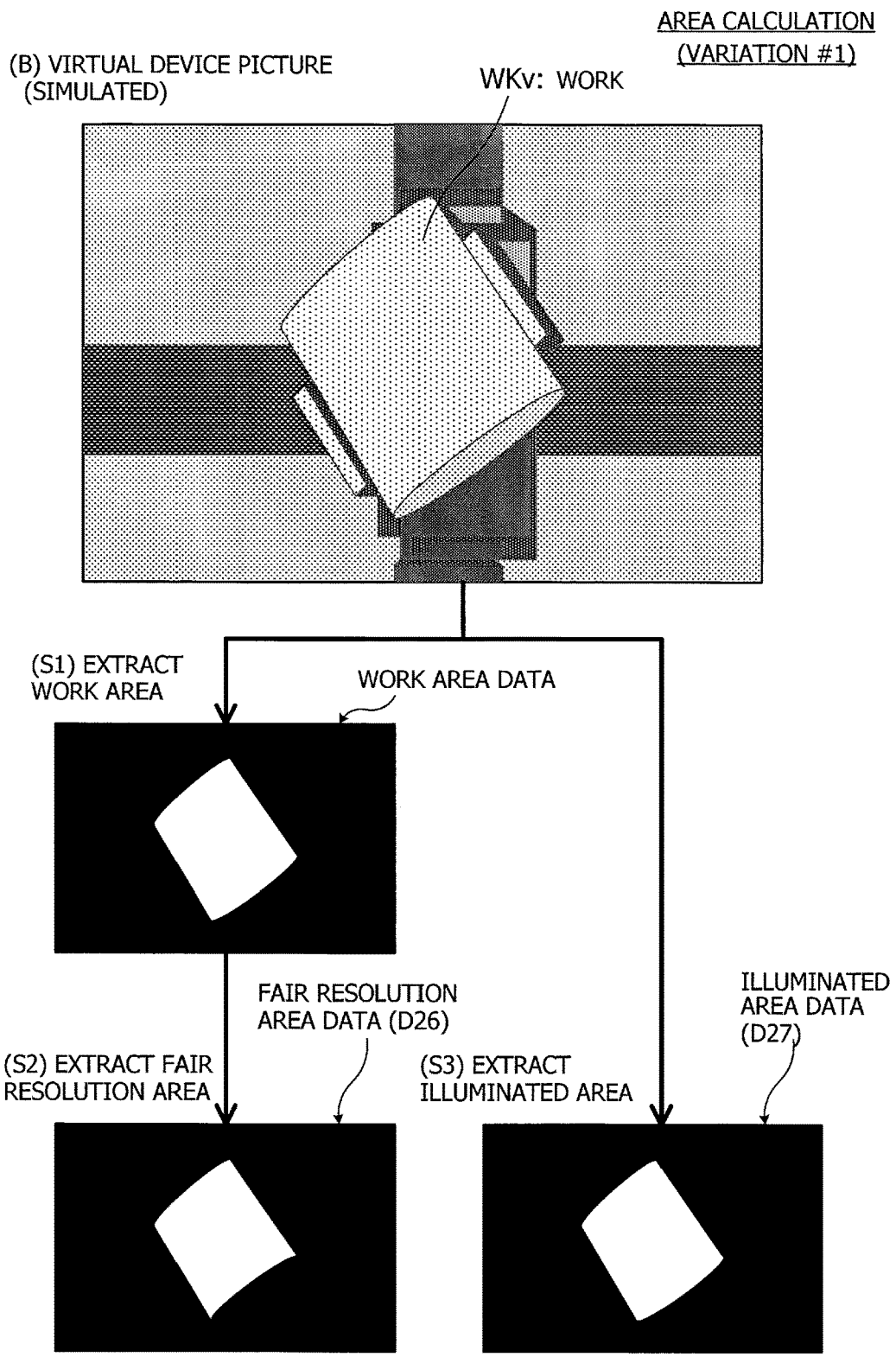

Referring now to FIGS. 25 and 26, this section describes a variation of the second embodiment. FIGS. 25 and 26 are first and second drawings that explain how to calculate secondary data according to variation #1 of the second embodiment.

Variation #1 is intended for the case in which the surface of a work WK acts as a bright-field illumination. In this case, the real device 100 takes a picture illustrated in FIG. 25, where almost the entire work area appears to be an illuminated area (although it is actually an "illuminating" area). The virtual device 310 also produces a similar picture whose work area is almost entirely an illuminated area as seen in the upper half of FIG. 26. Secondary data is calculated in the same way as in FIG. 14, thus producing work area data, fair resolution area data D26, and illuminated area data D27 seen in the lower half of FIG. 26. While the illuminated area data is not distinguishable from the work area data, the same method discussed above in the second embodiment may be used for the inspection and teaching.

Variation #1 has been discussed above. The next section will describe another variation of the second embodiment.

2-7. Variation #2 (Thermal Simulation)

Figure 27:
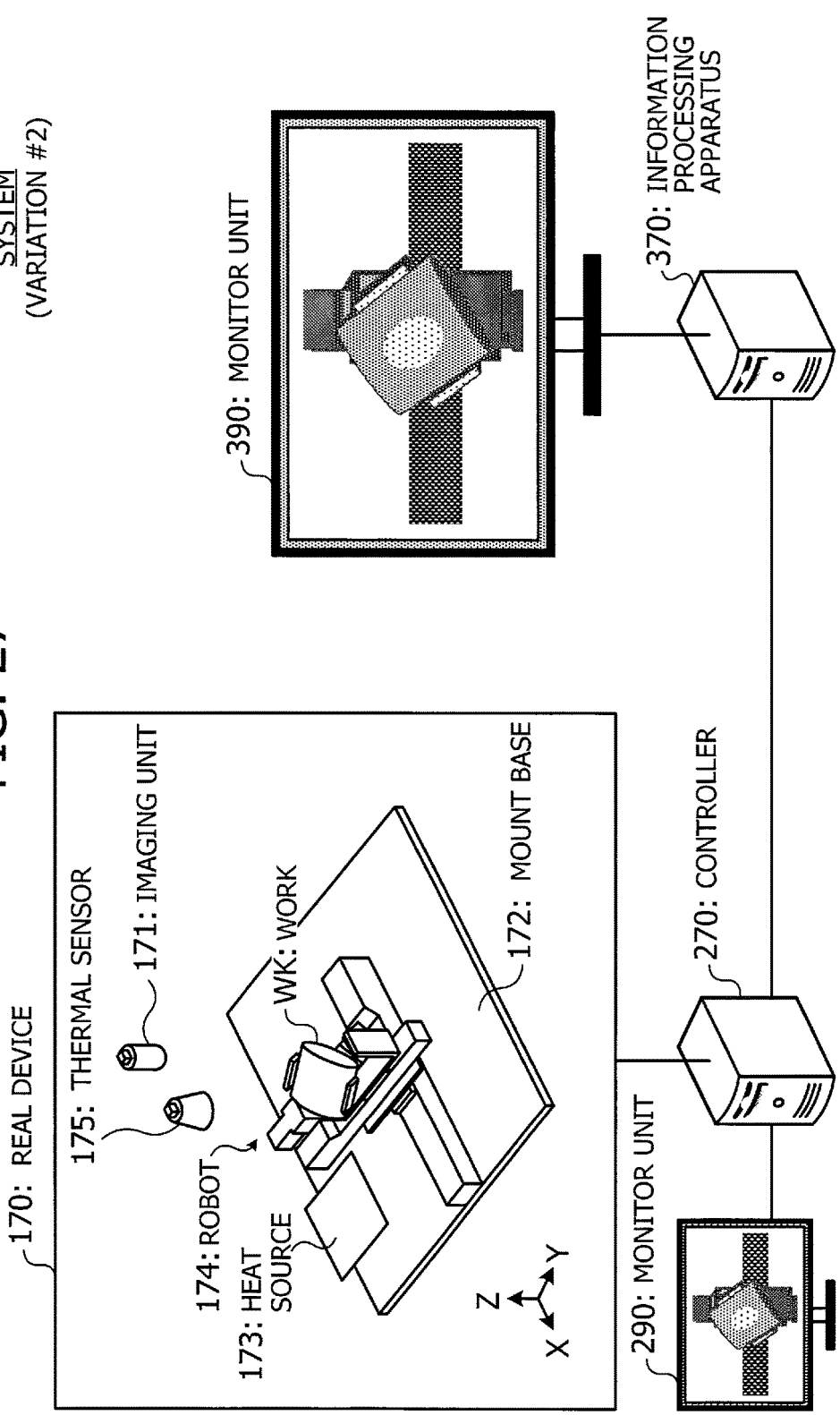

Referring now to FIGS. 27 and 28, this section describes another variation of the second embodiment. FIGS. 27 and 28 are first and second drawings that explain how to calculate secondary data according to variation #2 of the second embodiment. While the foregoing second embodiment assumes the use of light for inspection of works, other energy sources may similarly be used for the inspection. Variation #2 discussed below uses a heat source as an example.

As seen in FIG. 27, the system according to Variation #2 is formed from a real device 170, a controller 270, an information processing apparatus 370, and monitor units 290 and 390. The real device 170 includes an imaging unit 171, a mount base 172, a heat source 173, a robot 174, and a thermal sensor 175. Each of these components of the real device 170 is controlled by the controller 270.

The imaging unit 171 is an image-capturing device directed to a region containing a work WK loaded on the robot 174. For example, the imaging unit 171 is formed from an optical system including lenses, an image sensor using CCD or CMOS technologies, and an imaging processor for data processing operation including analog-to-digital conversion and digital signal processing. The mount base 172 is a base structure for placing a heat source 173 and robot 174.

The heat source 173 is located above the mount base 172 to heat a target area including the work WK on the robot 104. The robot 174 is a mechanism for grasping the work WK and changing its position and orientation as desired. The real device 170 is used to inspect, for example, the condition of the work WK. More specifically, the real device 170 heats a surface of the work WK and captures a thermal distribution across the surface. The captured thermal distribution is analyzed to find a defect in the work WK.

The work WK may have a complex 3D shape that would limit the range where the heat is delivered equally. For this reason, the robot 174 in the real device 170 changes positions and postures of the heated work WK, such that the thermal sensor 175 can capture its thermal distributions from different angles. Pictures of the work WK are also taken by the imaging unit 171. Multiple thermal distributions captured with various positions and postures of the work WK make it possible to analyze a larger surface area of the work WK.

The above real device 170 captures multiple thermal distributions by changing the target area of the heat source. The choice of target areas is made by a human operator. The operator may, however, not be able to exactly remember previous target areas on the work surface once the position and posture of the work WK are changed. For this reason, the operator could accidentally skip some part of the work WK during its inspection, or would otherwise take a long time to complete the inspection because of overly duplicated target ranges that the operator specified in an attempt to ensure a full test coverage. In view of these problems, the system according to Variation #2 facilitates the operator to achieve a full inspection of a work by providing a mechanism for him or her to easily recognize heat target areas.

As mentioned above, the real device 170 is operated under the control of the controller 270. This controller 270 is connected to an information processing apparatus 370 via a communication link. For example, the controller 270 uses socket communication to send the information processing apparatus 370 control data for the real device 170. The controller 270 also has its monitor unit 290, which may be a CRT, LCD, PDP, ELD, or other type of display device. The controller 270 uses its monitor unit 290 to display some pictures taken by the imaging unit 171, so that the operator manipulates the system while viewing these pictures.

The information processing apparatus 370 holds 3D CAD data of the real device 170 and uses it to produce a virtual device representing the real device 170 in a virtual space. The information processing apparatus 370 receives control data for the real device 170 and simulates how the virtual device operates in accordance with the received control data. The information processing apparatus 370 calculates a thermal distribution on the surface of the work WK.

For example, the information processing apparatus 370 executes a simulation for thermal analysis, thus obtaining a surface temperature distribution of a work WKv in the virtual device. The information processing apparatus 370 then calculates a region of the work surface whose temperature is higher than a predetermined threshold. For example, the information processing apparatus 370 produces high temperature area data D29 (S3) as seen in FIG. 28, besides generating fair resolution area data D28 (S1, S2) with the foregoing method of FIG. 16. The information processing apparatus 370 then extracts an overlapping area between the fair resolution area data D28 and the high temperature area data D29, thereby producing a piece of secondary data.

The information processing apparatus 370 further calculates a picture taken in the virtual device and sends the picture to the controller 270 together with the secondary data produced above. The calculated picture is also seen on the monitor unit 390. The information processing apparatus 370 holds the secondary data after converting it into 3D CAD data form. This secondary data is sent to the controller 270, as needed, and displayed on its monitor unit 290 in the form of an overlay image.

Variation #2 of the second embodiment has been described above. As can be seen from Variation #2, the techniques proposed in the second embodiment may similarly work with a different energy source or field source. For example, a sound source and an electromagnetic field source may be used in place of the heat source. In the former case, the real device is given a sound source and a microphone, and a sound simulation is performed to apply the above-described techniques. In the latter case, the real device is given an electromagnetic field source and an electromagnetic field sensor, and an electromagnetic field simulation is performed to apply the above-described techniques.

3. CONCLUSION

Two embodiments and their variations have been discussed above. According to one aspect, the proposed techniques enable more efficient teaching operations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a memory configured to store three-dimensional data describing a real device including an object, a light source that exposes the object to light with an illumination pattern for a surface inspection of the object, and an imaging device directed to a range containing the object; and
a processor configured to perform a procedure including:
producing a virtual device that represents the real device in a virtual space, based on the three-dimensional data in the memory,
simulating, with the virtual device, an intensity of reflected light of illumination light from the light source on a surface of the object,
calculating a region of the object as an inspection range for the surface inspection using the light with the illumination pattern, the region being where the simulated intensity satisfies a specified condition, and
controlling the light source to adjust an intensity of the light with the illumination pattern on the basis of an image corresponding to the inspection range in a captured image by the imaging device of the real device.

2. The information processing apparatus according to claim 1, wherein:
the memory stores information about a first condition for the simulated intensity and information about a second condition for a geometry of the object; and
the inspection range calculated by the processor is an overlap between first and second regions of the object, the first region satisfying the first condition, the second region satisfying the second condition.

3. The information processing apparatus according to claim 2, further comprising an input unit that receives input information specifying an exceptional region of the object, wherein:
the processor calculates a third region of the object, the third region excluding the exceptional region specified in the input information received by the input unit; and
the inspection range calculated by the processor is an overlap of the first, second, and third regions.

4. The information processing apparatus according to claim 2, wherein:
the first condition is that the simulated intensity is equal to or greater than a predetermined threshold.

5. The information processing apparatus according to claim 2, wherein:
the processor produces a two-dimensional picture based on data obtained from the imaging device in the virtual device; and
the first region and the second region are within the picture.

6. The information processing apparatus according to claim 5, wherein:
the processor converts the overlap into three-dimensional data form in the virtual space and stores information about the converted overlap into the memory.

7. The information processing apparatus according to claim 6, wherein:
the processor displays an image of the virtual device on a monitor screen, and overlays thereon the overlap described in the stored information in the memory.

8. A method for calculating an inspection range, the method comprising:
obtaining, by a processor, three-dimensional data describing a real device from a memory, the real device including an object, a light source that exposes the object to light with an illumination pattern for a surface inspection of the object, and an imaging device directed to a range containing the object; and
producing, by the processor, a virtual device that represents the real device in a virtual space, based on the three-dimensional data in the memory;
simulating, by the processor with the virtual device, an intensity of reflected light of illumination light from the light source on a surface of the object,
calculating, by the processor, a region of the object as an inspection range for the surface inspection using the light with the illumination pattern, the region being where the simulated intensity satisfies a specified condition, and
controlling the light source to adjust an intensity of the light with the illumination pattern on the basis of an image corresponding to the inspection range in a captured image by the imaging device of the real device.

9. The method according to claim 8, wherein:
the memory stores information about a first condition for the simulated intensity and information about a second condition for a geometry of the object; and
the inspection range calculated by the processor is an overlap between first and second regions of the object, the first region satisfying the first condition, the second region satisfying the second condition.

10. The method according to claim 9, wherein:
the processor calculates a third region of the object, the third region excluding an exception region specified by input information that is received; and
the inspection range calculated by the processor is an overlap of the first, second, and third regions.

11. The method according to claim 9, wherein:
the first condition is that the simulated intensity is equal to or greater than a predetermined threshold.

12. The method according to claim 9, wherein:
the processor produces a two-dimensional picture based on data obtained from the imaging device in the virtual device; and
the first region and the second region are within the picture.

13. The method according to claim 12, wherein:
the processor converts the overlap into three-dimensional data form in the virtual space and stores data of the converted overlap into the memory.

14. The method according to claim 13, wherein:
the processor displays an image of the virtual device on a monitor screen, and overlays thereon the overlap described in the stored information in the memory.

15. A non-transitory computer-readable storage medium storing a program that causes a computer to perform a procedure comprising:
obtaining, from a memory, three-dimensional data describing a real device including an object, a light source that exposes the object to light with an illumination pattern for a surface inspection of the object, and an imaging device directed to a range containing the object; and
producing a virtual device that represents the real device in a virtual space, based on the three-dimensional data in the memory;
simulating, with the virtual device, an intensity of reflected light of illumination light from the light source on a surface of the object, calculating a region of the object as an inspection range for the surface inspection using the light with the illumination pattern, the region being where the simulated intensity satisfies a specified condition, and controlling the light source to adjust an intensity of the light with the illumination pattern on the basis of an image corresponding to the inspection range in a captured image by the imaging device of the real device.

\* \* \* \* \*